(12) United States Patent
Rugeland et al.

(10) Patent No.: US 12,256,256 B2
(45) Date of Patent: Mar. 18, 2025

(54) HANDLING OF MISMATCH BETWEEN UE AND NETWORK EARLY MEASUREMENT HANDLING CAPABILITIES DURING EARLY MEASUREMENT REPORTING

(71) Applicant: Telefonaktiebolaget LM Ericsson (publ), Stockholm (SE)

(72) Inventors: Patrik Rugeland, Stockholm (SE); Oumer Teyeb, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/768,242

(22) PCT Filed: Oct. 2, 2020

(86) PCT No.: PCT/SE2020/050935
§ 371 (c)(1),
(2) Date: Apr. 12, 2022

(87) PCT Pub. No.: WO2021/076028
PCT Pub. Date: Apr. 22, 2021

(65) Prior Publication Data
US 2024/0381145 A1 Nov. 14, 2024

(30) Foreign Application Priority Data

Oct. 15, 2019 (EP) .................................... 19203441

(51) Int. Cl.
*H04W 24/10* (2009.01)
*H04W 76/19* (2018.01)
*H04W 76/27* (2018.01)

(52) U.S. Cl.
CPC .......... *H04W 24/10* (2013.01); *H04W 76/19* (2018.02); *H04W 76/27* (2018.02)

(58) Field of Classification Search
CPC ...... H04W 24/10; H04W 76/19; H04W 76/27
See application file for complete search history.

(56) References Cited

U.S. PATENT DOCUMENTS

| 2013/0235738 A1* | 9/2013 | Siomina | ............ H04W 72/1263 370/252 |
| 2014/0146696 A1* | 5/2014 | Lin | ........................ H04L 5/0094 370/252 |

(Continued)

FOREIGN PATENT DOCUMENTS

| CN | 106851715 A | 6/2017 |
| CN | 107852631 A | 3/2018 |
| CN | 109309969 A | 2/2019 |

OTHER PUBLICATIONS

3GPP TSG-RAN#80 RP-181469—New WID on DC and CA enhancements (NR_DCCA_Enh), La Jolla, CA, USA, Jun. 11-14, 2018 (Year: 2018).*

(Continued)

*Primary Examiner* — Edan Orgad
*Assistant Examiner* — Malick A Sohrab
(74) *Attorney, Agent, or Firm* — Withrow & Terranova, PLLC

(57) ABSTRACT

The present disclosure relates to the field of wireless network communications, and more particularly to a user equipment (UE) adapted to perform measurements. Techniques and methods are discussed for the handling of a mismatch between UE and network early measurement handling capabilities during early measurement reporting.

13 Claims, 16 Drawing Sheets

(56) References Cited

U.S. PATENT DOCUMENTS

| | | | | |
|---|---|---|---|---|
| 2016/0080958 | A1* | 3/2016 | Rinne | H04W 24/10 370/338 |
| 2016/0081021 | A1* | 3/2016 | Abdel-Samad | H04W 76/50 370/311 |
| 2017/0006510 | A1* | 1/2017 | Kaikkonen | H04W 48/16 370/311 |
| 2017/0134980 | A1* | 5/2017 | Persson | H04W 24/10 |
| 2018/0063735 | A1* | 3/2018 | Raghunathan | H04W 24/08 |
| 2019/0037425 | A1* | 1/2019 | Hong | H04W 72/23 |
| 2022/0046456 | A1* | 2/2022 | Kumar | H04W 24/10 |
| 2022/0225144 | A1* | 7/2022 | Virtej | H04W 76/27 |

OTHER PUBLICATIONS

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.6.0, Jun. 2019, 3GPP Organizational Partners, 956 pages.

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.7.0, Sep. 2019, 3GPP Organizational Partners, 962 pages.

Author Unknown, "Technical Specification Group Radio Access Network; NR; Radio Resource Control (RRC) protocol specification (Release 15)," Technical Specification 38.331, Version 15.6.0, Jun. 2019, 3GPP Organizational Partners, 519 page.

Ericsson, "R2-1900693: Signalling of early measurements for CA/DC setup," 3GPP TSG-RAN WG2 #105, Feb. 25-Mar. 1, 2019, Athens, Greece, 9 pages.

Ericsson, "R2-1910248: Signaling of early measurements with Resume Request," 3GPP TSG-RAN WG2#107, Aug. 26-30, 2019, Prague, Czech Republic, 8 pages.

Ericsson, et al., "RP-181469: New WID on DC and CA enhancements (NR_DCCA_Enh)," 3GPP TSG-RAN#80, Jun. 11-14, 2018, La Jolla, California, 5 pages.

VIVO, "R2-1811910: Discussion on UE behavior related to SIB2 idle measurement indication," 3GPP TSG-RAN WG2 Meeting #103, Aug. 20-24, 2018, Gothenburg, Sweden, 2 pages.

International Search Report and Written Opinion for International Patent Application No. PCT/EP2020/050935, mailed Dec. 14, 2020, 11 pages.

International Preliminary Report on Patentability for International Patent Application No. PCT/SE2020/050935, mailed Jul. 6, 2021, 14 pages.

Interdigital, "R2-1814021: Summary of [103#50][NR late drop]—MR-DC configuration in INACTIVE (Interdigital)," 3GPP TSG-RAN WG2 Meeting #103bis, Oct. 8-12, 2018, Chengdu, China, 18 pages.

First Office Action for Chinese Patent Application No. 2020800772696.2, mailed Nov. 15, 2023, 9 pages.

* cited by examiner

HANDLING OF MISMATCH BETWEEN UE AND NETWORK EARLY MEASUREMENT HANDLING CAPABILITIES DURING EARLY MEASUREMENT REPORTING

This application is a 35 U.S.C. § 371 national phase filing of International Application No. PCT/SE2020/050935, filed Oct. 2, 2020, which claims the benefit of European Patent Application EP19203441.1, filed Oct. 15, 2019, the disclosures of which are incorporated herein by reference in their entireties.

TECHNICAL FIELD

The present disclosure generally relates to the field of wireless network communications, and more particularly, to a user equipment (UE) adapted to perform measurements.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Existing Solution for Early Measurements Upon Idle to Connected Transition in LTE (Rel-15)

In Long Term Evolution (LTE) Release (Rel) 15 (Rel-15), it is possible to configure a User Equipment (UE) to report so-called 'early measurements' upon the transition from idle to connected state. These measurements are measurements that the UE can perform in idle state, and according to a configuration provided by the source cell with the intention to receive these measurements immediately after the UE gets connected, and quickly set up Carrier Aggregation (CA) and/or other forms of Dual Connectivity (DC) (e.g. E-UTRA New Radio (NR) Dual Connectivity (EN-DC), Multi-Radio Dual Connectivity (MR-DC), etc.) without the need to first provide a measurement configuration (measConfig) in RRC_ CONNECTED, and wait for hundreds of milliseconds until first samples are collected, monitored and then the first reports are triggered and transmitted to the network.

Measurement configuration for early measurements upon resume in LTE—A first aspect of the existing solution, as standardized in EUTRA 36.331 v15.7.0, is described in section 5.6.20 Idle Mode Measurements. The UE can receive these idle mode measurement configurations in the system information (SIB5) in the field MeasIdleConfigSIB-r15, indicating up to 8 cells or ranges of cell IDs to perform measurements on. In addition, the UE can be configured upon the transition from RRC_CONNECTED to RRC_IDLE with a dedicated measurement configuration in the RRCConnectionRelease message with the measIdleDedicated-r15 which overrides the broadcasted configurations in SIB5. The broadcasted and dedicated signalling is shown below:

```
RRCConnectionRelease message
-- ASN1START
RRCConnectionRelease ::=                    SEQUENCE {
    rrc-TransactionIdentifier                   RRC-TransactionIdentifier,
    criticalExtensions                          CHOICE {
        c1                                          CHOICE {
            rrcConnectionRelease-r8                     RRCConnectionRelease-r8-
IEs,
            spare3 NULL, spare2 NULL, spare1 NULL
        },
        criticalExtensionsFuture                    SEQUENCE { }
    }
}
-- other info has been omitted
RRCConnectionRelease-v1530-IEs ::=          SEQUENCE {
    drb-ContinueROHC-r15                        ENUMERATED {true}
        OPTIONAL,       -- Cond UP-EDT
    nextHopChainingCount-r15                    NextHopChainingCount
        OPTIONAL,       -- Cond UP-EDT
    measIdleConfig-r15                          MeasIdleConfigDedicated-r15
        OPTIONAL,       -- Need ON
    rrc-InactiveConfig-r15                      RRC-InactiveConfig-r15
        OPTIONAL,       -- Need OR
    cn-Type-r15                                 ENUMERATED {epc,fivegc}
        OPTIONAL,       -- Need OR
    nonCriticalExtension                        SEQUENCE { }
        OPTIONAL
}
-- ASN1STOP
MeasIdleConfig information element
-- ASN1START
MeasIdleConfigSIB-r15 ::= SEQUENCE {
    measIdleCarrierListEUTRA-r15            EUTRA-CarrierList-r15,
    ...
}
```

```
MeasIdleConfigDedicated-r15 ::= SEQUENCE {
    measIdleCarrierListEUTRA-r15        EUTRA-CarrierList-r15
        OPTIONAL,        -- Need OR
    measIdleDuration-r15                ENUMERATED {sec10, sec30, sec60, sec120,
                                                    sec180,
sec240, sec300, spare},
    ...
}
EUTRA-CarrierList-r15 ::= SEQUENCE (SIZE (1..maxFreqIdle-r15)) OF
MeasIdleCarrierEUTRA-r15
MeasIdleCarrierEUTRA-r15::=             SEQUENCE {
    carrierFreq-r15                         ARFCN-ValueEUTRA-r9,
    allowedMeasBandwidth-r15                AllowedMeasBandwidth,
    validityArea-r15                        CellList-r15
        OPTIONAL,        -- Need OR
    measCellList-r15                        CellList-r15
        OPTIONAL,        -- Need OR
    reportQuantities                        ENUMERATED {rsrp, rsrq, both},
    qualityThreshold-r15                    SEQUENCE {
        idleRSRP-Threshold-r15                  RSRP-Range
        OPTIONAL,        -- Need OR
        idleRSRQ-Threshold-r15                  RSRQ-Range-r13
        OPTIONAL        -- Need OR
    }
                            OPTIONAL,       -- Need OR
    ...
}
CellList-r15 ::=        SEQUENCE (SIZE (1.. maxCellMeasIdle-r15)) OF PhysCellIdRange
-- ASN1STOP
```

Another aspect of the existing solution occurs when the UE tries to resume or setup a call from RRC_IDLE without context. If the previous step is performed, i.e., if the UE is configured to store idle measurements, the network may request the UE after resume/setup (after security is activated) whether the UE has idle measurements available.

In the case this UE is setting up a connection coming from RRC_IDLE without the Access Stratum, AS, Context, the network is not aware that the UE has available measurements stored. Then, to allow the network to know that, and possibly request the UE to report early measurements, the UE may indicate the availability of stored idle measurements in RRCConnectionSetupComplete. As not all cells would support the feature anyway, the UE only includes that availability information if the cell broadcasts in SIB2 the idleModeMeasurements indication. The flag in RRCConnectionSetupComplete and procedure text are shown below:

In the case this UE is setting up a connection coming from RRC_IDLE but with a stored AS Context (i.e. resume from suspended), the network may be aware that the UE may have available idle measurements stored after checking the fetched context from the source node where the UE got suspended. However, it is still not certain that the UE has measurements available since the UE is only required to perform the measurements if the cells are above the configured Reference Symbol/Signal Received Power (RSRP)/ Reference Symbol/Signal Received Quality (RSRQ) thresholds and while it performs cell selection/cell reselection within the configured validity area. Then, to allow the network to know that, and possibly request the UE to report early measurements, the UE may also indicate the availability of stored idle measurements in RRCConnectionResumeComplete. As not all cells would support the feature anyway, the UE only includes that availability information if the cell broadcasts in SIB2 the idleModeMeasurements indication. The flag in RRCConnectionResumeComplete and procedure text are shown below:

```
RRCConnectionSetupComplete-v1530-IEs ::= SEQUENCE {
    logMeasAvailableBT-r15      ENUMERATED {true}       OPTIONAL,
    logMeasAvailableWLAN-r15    ENUMERATED {true}       OPTIONAL,
    idleMeasAvailable-r15       ENUMERATED {true}       OPTIONAL,
    flightPathInfoAvailable-r15 ENUMERATED {true}       OPTIONAL,
    connectTo5GC-r15            ENUMERATED {true}       OPTIONAL,
    registeredAMF-r15           RegisteredAMF-r15       OPTIONAL,
    s-NSSAI-list-r15            SEQUENCE(SIZE (1..maxNrofS-NSSAI-r15)) OF S-
NSSAI-r15 OPTIONAL,
    ng-5G-S-TMSI-Bits-r15       CHOICE {
        ng-5G-S-TMSI-r15            NG-5G-S-TMSI-r15,
        ng-5G-S-TMSI-Part2-r15      BIT STRING (SIZE (8))
    }                                                   OPTIONAL,
    nonCriticalExtension        RRCConnectionSetupComplete-v1540-IEs
        OPTIONAL
}
```

```
RRCConnectionResumeComplete-v1530-IEs ::= SEQUENCE {
    logMeasAvailableBT-r15              ENUMERATED {true}    OPTIONAL,
    logMeasAvailableWLAN-r15            ENUMERATED {true}    OPTIONAL,
    idleMeasAvailable-r15               ENUMERATED {true}    OPTIONAL,
    flightPathInfoAvailable-r15         ENUMERATED {true}    OPTIONAL,
    nonCriticalExtension                SEQUENCE { }         OPTIONAL
}
```

Once the UE indicates to the target cell upon resume or setup that idle measurements are available, the network may finally request the UE to report these available measurements by including the field idleModeMeasurementReq in the UEInformationRequest message transmitted to the UE. Then, the UE responds with a UEInformationResponse containing these measurements. FIG. 1 illustrates the UEInformationRequest message being transmitted to the UE by the EUTRAN and the UE responding with a UEInformationResponse message containing the measurements.

The content of the UEInformationResponse message is shown below

```
                        UEInformationResponse message

-- ASN1START
UEInformationResponse-r9      ::=    SEQUENCE {
    rrc-TransactionIdentifier            RRC-TransactionIdentifier,
    criticalExtensions                   CHOICE {
        c1                                   CHOICE {
            ueInformationResponse-r9             UEInformationResponse-r9-IEs,
            spare3 NULL, spare2 NULL, spare1 NULL
        },
        criticalExtensionsFuture             SEQUENCE { }
    }
}
UEInformationResponse-v1530-IEs ::= SEQUENCE {
    measResultListIdle-r15               MeasResultList Idle-r15    OPTIONAL,
    flightPathInfoReport-r15             FlightPathInfoReport-r15   OPTIONAL,
    nonCriticalExtension                 SEQUENCE { }               OPTIONAL
}
```

Introducing of Early Measurements Upon Idle/Inactive to Connected Transition in NR (Rel-16)

A work item has been approved in Release 16 (Rel-16) to enhance the setup of CA/DC in NR. The WID "Enhancing CA Utilization" was approved in RAN #80 in RP-181469, one of the objectives is the following:

Early Measurement reporting: Early and fast reporting of measurements information availability from neighbor and serving cells to reduce delay setting up MR-DC and/or CA. [RAN2, RAN4]

This objective applies to MR-DC, NR-NR DC and CA

The objective should consider measurements in IDLE, INACTIVE mode and CONNECTED mode The impacts on UE power consumption should be minimized The LTE Rel-15 euCA work should be utilized, when applicable Hence, 3GPP is currently investigating solutions to enable early measurements performed when the UE is in RRC_INACTIVE or RRC_IDLE state and reporting mechanisms for when the UE enters RRC_CONNECTED.

Three different kinds of solutions are being considered:

1/UE reports early measurements in UEInformationResponse after request from network in UEInformationRequest transmitted after the UE sends an RRCResumeComplete or, after security is activated when UE comes from idle without stored context (as in LTE Rel-15);

2/UE reports early measurements with (e.g. multiplexed with or as part of the message) RRCResumeComplete;

3/UE reports early measurements with (e.g. multiplexed with or as part of the message) RRCResumeRequest;

There are some differences in details of each of these solutions, and not all of them may be applicable for RRC_IDLE in the same way they are for RRC_INACTIVE. However, in any of these solutions for the reporting, the UE relies on a measurement configuration, which may be provided with dedicated signalling when the UE is suspended to RRC_INACTIVE or when the UE is released to RRC_IDLE. That measurement configuration indicates how the UE shall perform these measurements to be reported when the UE resumes (in the case of coming from RRC_INACTIVE or setups up a connection, in the case of coming from RRC_IDLE).

The signalling diagrams in FIGS. 2, 3, 4 and 5 indicate the current agreements regarding the early measurement signalling in LTE/NR Rel-16. FIGS. 2 and 3 show options 1 and 2 respectively for early measurement reporting in LTE/NR IDLE mode in Rel-16 during connection setup. FIG. 4 shows an option for early measurement reporting in LTE IDLE with suspended, LTE INACTIVE mode or NR INACTIVE mode in Rel-16. FIG. 5 shows a second option for early measurement reporting in NR INACTIVE mode in Rel-16, and it is for further study (FFS) if this is applicable to LTE IDLE with suspended and LTE INACTIVE modes.

Early Measurement Configurations and Results in Rel-16 LTE and NR

In RAN2 #105 bis meeting, it has been agreed:

| Agreements |
| --- |
| 1: NR early measurements can be configured in both NR RRCRelease message and NR system information. |
| FFS: Whether there are differences in the configuration that can be provided by RRCRelease and SI. |
| 2: Introduce some indication about the cell's early measurement support in NR system information. |
| 3: To control the duration of UE performing both IDLE and INACTIVE measurements, a single validity timer (similar to measIdleDuration in LTE euCA) is mandatory indicated only in NR RRCRelease message, i.e. not included in NR SIB. |
| 4: For both IDLE and INACTIVE early measurements, the following IEs can be optionally configured per NR frequency in both NR RRCRelease message and NR SIB: |
| - A list of frequencies and optionally cells (similar to measCellList in LTE euCA) the UE is required to perform early measurements. |
| - A cell quality threshold (similar to qualityThreshold in LTE euCA) the UE is required to report the measurement results only for the cells which met the configured thresholds. |
| FFS: A validity Area (similar to validityArea in LTE euCA) to indicate the list of cells within which UE is required to perform early measurements. If the UE reselects to a cell outside this list, the early measurements are no longer required (same as timer expiry). |
|     o If it is absent, the UE will not have area limitation of early measurements. |
| For SSB based measurements: |
| 5: For both IDLE and INACTIVE early measurements, SSB frequencies to be measured can be located out of sync raster |
| 6: For both IDLE and INACTIVE early measurements, RSRP and RSRQ can be configured as cell and beam measurement quantity. |
| 7: For both IDLE and INACTIVE early measurements, the configuration parameters provided per SSB frequency follow the same principles as those provided in SIB2/4 for the purposes of Idle/Inactive mobility. (Details differences can be discussed at stage 3 level) |
| 8: As LTE euCA, cell/beam SINR is not introduced as measurement quantity in NR early measurement configuration in Rel-16. |
| For SSB based beam level measurement configurations: |
| 9 The UE is required to report the beam with the highest measurement quantity |
| FFS: Whether additional beams can be reported. |
| 10: For both IDLE and INACTIVE early measurements, the UE can be configured with one of the 3 beam reporting types |
| 1) No beam reporting; |
| 2) Only beam identifier |
| 3) Both beam identifier and quantity |
| FFS: Whether to support CSI-RS based NR early measurements |
| 11: LTE UE in IDLE mode, IDLE with suspended, and INACTIVE can be configured with NR early measurements to support fast setup of (NG)EN-DC (i.e. euCA is extended to support NR measurements). Details are FFS |

That is, the Rel-16 early measurement configurations and reporting will include NR measurements as well, in contrast to the LTE Rel-15 early measurement configurations that contained only LTE measurements and there will be an indication introduced to indicate whether the cell supports early measurements.

Furthermore, during RAN2 #107 it was agreed:

| Agreements |
| --- |
| 1: For per-frequency SSB measurement configuration reuse the IE structure that is currently used in SIBs for cell reselection purposes. |
| 2: The legacy SSB measurement configurations in NR SIB2/4 and LTE SIB24 are reused for NR early measurements performed in frequencies which are candidates of cell selection/reselection, i.e. not introduce new measurement configurations in NR/LTE SIB for these SSBs. |
| 3: Same as LTE euCA, NR frequency list (not the SSB measurement configuration) can be different between RRC release and SIB. The frequency list, if provided, in RRC release message overrides the one provided in SIB. |
| 4 For per frequency SSB measurement configuration for purpose of only early measurements, it can be included in both RRC release message and SIB. If provided in RRC release message, it overrides the one provided in SIB in the cell where the RRC Release message is received. ( |
| FFS How UE manages the situation when an SSB measurement configuration for a given frequency is provided in SIB of the current cell and was also provided RRC Release (in an earlier cell). |
| 7: As in LTE euCA, the indication whether to report RSRP, RSRQ or both can be indicated in both RRC release message and SIB. If provided in RRC release, it overrides the one in SIB. |

| | -continued |
|---|---|
| 8: | Similar to LTE euCA, the indication of beam reporting type (i.e. whether to, not report beam results, report only the beam index, or report both beam index and results) can be indicated in both RRC release message and SIB. If provided in RRC release, it overrides the one in SIB. |
| 9: | NR early measurement configuration is included in a new NR SIB. |
| 10: | NR early measurement configuration is included in LTE SIB5 (i.e. the SIB including LTE early measurement configurations) |
| 11: | It is not necessary to specify CSI-RS based early measurements for the case of SCell with SSB in Rel-16. |
| 12: | It is not necessary to specify CSI-RS based early measurements for the case of SCell without SSB in Rel-16. |
| 13: | In NR early measurement configuration, the UE can be configured with maximum number for beam reporting and only beams above configured threshold for cell quality derivation are required to be reported (as NR CONNECTED measurements). |
| 14 | Do not support the network provide information on network's support of CA/DC between frequencies to assist the UE to determine which frequencies to provide NR early measurement in Rel-16. |
| 15 | Do not support a mechanism to prevent outdated early measurement reporting in Rel-16 |

| Agreements: | |
|---|---|
| 1 | Upon the reception of the RRCSetup message in response to RRCSetupRequest or RRCResumeRequest (while T331 is running), the UE stops T331, and deletes the dedicated idle mode measurement configuration, if any. |
| 2: | Upon the reception of the RRCReject message in response to RRCSetupRequest or RRCResumeRequest (while T331 is running), the UE keeps performing the idle mode measurements. |
| 3: | During a 2-step resume (i.e. RRCRelease in response to RRCResumeRequest), the network can release or reconfigure the idle mode measurements. |
| | FFS whether this is delta or complete replace |
| 4: | Upon the expiry of T331 while in IDLE or INACTIVE mode, the UE deletes the dedicated idle mode measurement configuration, if any. |
| 5: | The UE deletes the early measurement results after it has successfully reported them to the network (i.e. in UEInformationResponse or RRCResumeComplete). |

That is, the idle mode measurement configurations in NR Rel-16 will be very similar to the LTE idle mode measurement configurations.

SUMMARY

There currently exist certain challenge(s). For LTE Rel-15, the network indicates the support for early measurements in SIB2 (using the field idleModeMeasurements-r15), and the UE will indicate the availability of the early measurements in RRCConnectionSetupComplete or RRCConnectionResumComplete messages (using the field idleMeasAvailable-r15). The network can then request the idle mode measurements using the UEInformationRequest message (using the field idleModeMeasurementReq-r15). Upon the reception of such a request, the UE responds with the UEInformationResponse message, including the results of the measurement performed while in RRC_IDLE or RRC_INACTIVE (which can include measurement results of LTE cells) by including it in the measResultListIdle-r15 field.

As discussed above in the Background section, it has been agreed to introduce NR measurement results also for measurements to be performed during RRC_IDLE or RRC_INACTIVE in LTE Rel-16. This could cause a problem regarding how the UE reports measurements in a network that is composed of a mixture of Rel-15 and Rel-16 eNBs (or even just Rel-16 eNBs, as some Rel-16 eNBs will not support all the Rel-16 features, and may support only the Rel-15 early measurement aspects). For example, assume a UE gets released while it was operating (in CONNECTED mode) in a Rel-16 eNB and gets configured to measure both LTE and NR cells. The UE then moves to a Rel-15 eNB (or a Rel-16 eNB that supports only the Rel-15 early measurement reporting feature) and the connection gets established/resumed there. It is not currently clear on how the UE will determine and act that the base station where it is establishing/resuming the connection supports only Rel-15 early measurements, and if so, on how it reports the measurements.

Similarly, if a UE was operating in a Rel-16 NR base station (gNB) when it was released and configured to perform idle mode measurements on both LTE and NR carriers, then if the UE then re-selects to a Rel-15 LTE eNB, the same issue ensues (i.e. how would the UE handle the stored LTE and NR measurement results).

Certain aspects of the present disclosure and their embodiments may provide solutions to these or other challenges. Mechanisms are provided to handle early measurement reporting in a scenario where there is a mismatch (e.g. in terms of release of the standard supported or a particular feature of a release that is implemented) between the wireless device (UE) and the network (eNB). Several methods/mechanisms/modifications are proposed. It will be appreciated that in various aspects or embodiments, some or all of the following methods/mechanisms/modifications can be used individually. It will also be appreciated that in various aspects or embodiments, any two or more of the following methods/mechanisms/modifications can be used in combination.

Introduction of a separate indicator in a Rel-16 eNB's system information block, SIB, (e.g. SIB2) for indicating the support of the Rel-16 early measurement reporting (i.e. eNB can process early measurement reports that contain measurements of NR cells).

Introduction of a separate indicator in a rel-16 UEInformation Request (e.g. idleModeMeasurementReq-r16) to indicate that the network wants the UE to send early measurement reports that contain NR results.

Introduction of a separate indicator in a rel-16 RRCConnectionSetupComplete or RRCConnectionResume- Complete (e.g. idleMeasAvailable-r16) to indicate to the network that the UE has early measurements that contain only NR or both LTE and NR results.

In one alternative, if the UE has Rel-16 early measurement results (i.e. both LTE and NR), and the target network node where the UE is resuming or establishing the connection to is broadcasting only support for Rel-15 early measurement handling, the UE can indicate idleMeasAvailable-r15, even though it has both LTE and NR results (and it will report only the LTE results as described below).

In another alternative, if the UE has Rel-16 early measurement results (i.e. only NR or both LTE and NR), and the target network node where the UE is resuming or establishing the connection to is broadcasting only support for Rel-15 early measurement handling, the UE may not indicate availability of early measurements at all to the network.

Modification of the UE idle mode measurement procedure handling so that:

Option 1: UE can have one Rel-16 UE variable (e.g. VarMeasIdleReport-r16) that it will use to store both the LTE and NR measurement results:

If the UE has been configured with Rel-16 early measurement configuration and has Rel-16 early measurement results that contain both LTE and NR results (or only LTE or only NR if the other is not available to measure), while the eNB that the UE is resuming or establishing the connection to supports only Re-15 early measurements (as indicated either the SIB or in the received UEInformationRequest), the UE can either:

Include only the LTE results in the early measurement report; or

Not send any early measurement report.

Option 2: The UE can use the Rel-15 UE variable (VarMeasIdleReport-r15) to store the LTE measurement results and a separate Rel-16 UE variable (e.g. VarMeasIdleReport-r16) to store the NR measurement results:

If the UE has been configured with Rel-16 early measurement configuration and has Rel-16 early measurement results that contain both LTE and NR results, while the eNB that the UE is resuming or establishing the connection to supports only Rel-15 early measurements (e.g. as indicated either in the SIB or in the received UEInformationRequest), the UE will only include the VarMeasIdleReport-r15 in the early measurement report. If the target eNB supports Rel-16 early measurements, the UE may include both VarMeasIdleReport-r15 and VarMeasIdleReport-r16 in the early measurement report.

There are, proposed herein, various embodiments which address one or more of the issues disclosed herein.

According to a first aspect, there is provided a method performed by a wireless device for handling early measurement reporting to a network node. The method comprises receiving a first indication from the network node, the first indication indicating a capability of the network node to receive early measurement reports for cells operating according to New Radio, NR.

According to a second aspect, there is provided a method performed by a base station for handling early measurement reporting from a wireless device. The method comprises sending a first indication to the wireless device, the first indication indicating a capability of the base station to receive early measurement reports for cells operating according to New Radio, NR.

According to a third aspect, there is provided a computer program product comprising a computer readable medium having computer readable code embodied therein. The computer readable code is configured such that, on execution by a suitable computer or processor, the computer or processor is caused to perform the method of the first aspect, the second aspect, or any embodiments thereof.

According to a fourth aspect, there is provided a wireless device configured for handling early measurement reporting to a network node. The wireless device is configured to receive a first indication from the network node, the first indication indicating a capability of the network node to receive early measurement reports for cells operating according to New Radio, NR.

According to a fifth aspect, there is provided a base station configured for handling early measurement reporting from a wireless device. The base station is configured to send a first indication to the wireless device, the first indication indicating a capability of the base station to receive early measurement reports for cells operating according to New Radio, NR.

According to a sixth aspect, there is provided a wireless device configured for handling early measurement reporting to a network node. The wireless device comprises a processor and a memory, the memory containing instructions executable by said processor whereby said wireless device is operative to receive a first indication from the network node, the first indication indicating a capability of the network node to receive early measurement reports for cells operating according to New Radio, NR.

According to a seventh aspect, there is provided a base station configured for handling early measurement reporting from a wireless device. The base station comprises a processor and a memory, the memory containing instructions executable by said processor whereby said base station is operative to send a first indication to the wireless device, the first indication indicating a capability of the base station to receive early measurement reports for cells operating according to New Radio, NR.

Certain embodiments may provide one or more of the following technical advantage(s). The techniques of the present disclosure can enable inter-operability between a Rel-15/Rel-16 UE and a Rel-15/Rel-16 eNB with regard to early measurement reporting. Without the methods proposed, a Rel-16 UE may end up sending early measurement reports that contain NR results and as such may not be understood/compiled by a Rel-15 eNB. This could effectively render the early measurement enhancement feature useless for some of the UEs in deployments that contain a mix of Rel-15 and Rel-16 eNBs, resulting in a degraded end user performance, as faster CA/DC setup will not be possible.

BRIEF DESCRIPTION OF THE DRAWINGS

Some of the embodiments contemplated herein will now be described more fully with reference to the accompanying drawings, in which.

DETAILED DESCRIPTION

Figure 1:
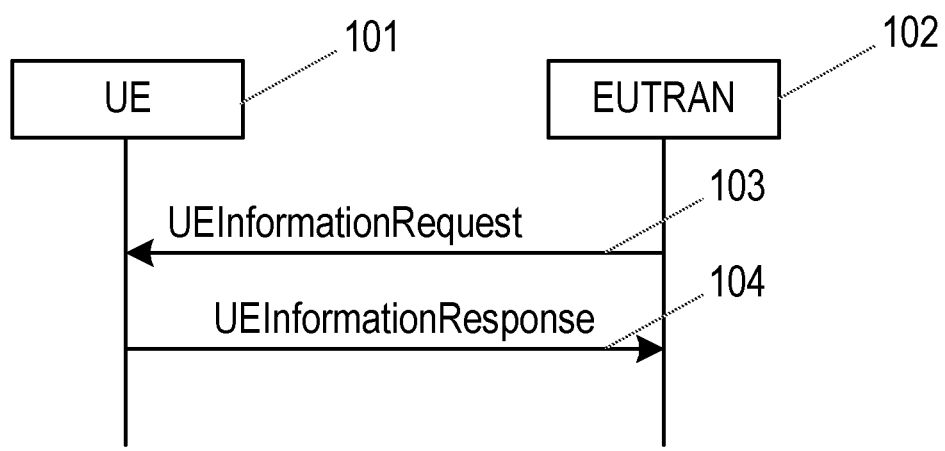
FIG. 1 illustrates the signalling between a UE and E-UTRAN for the request and sending of measurements.
Figure 2:
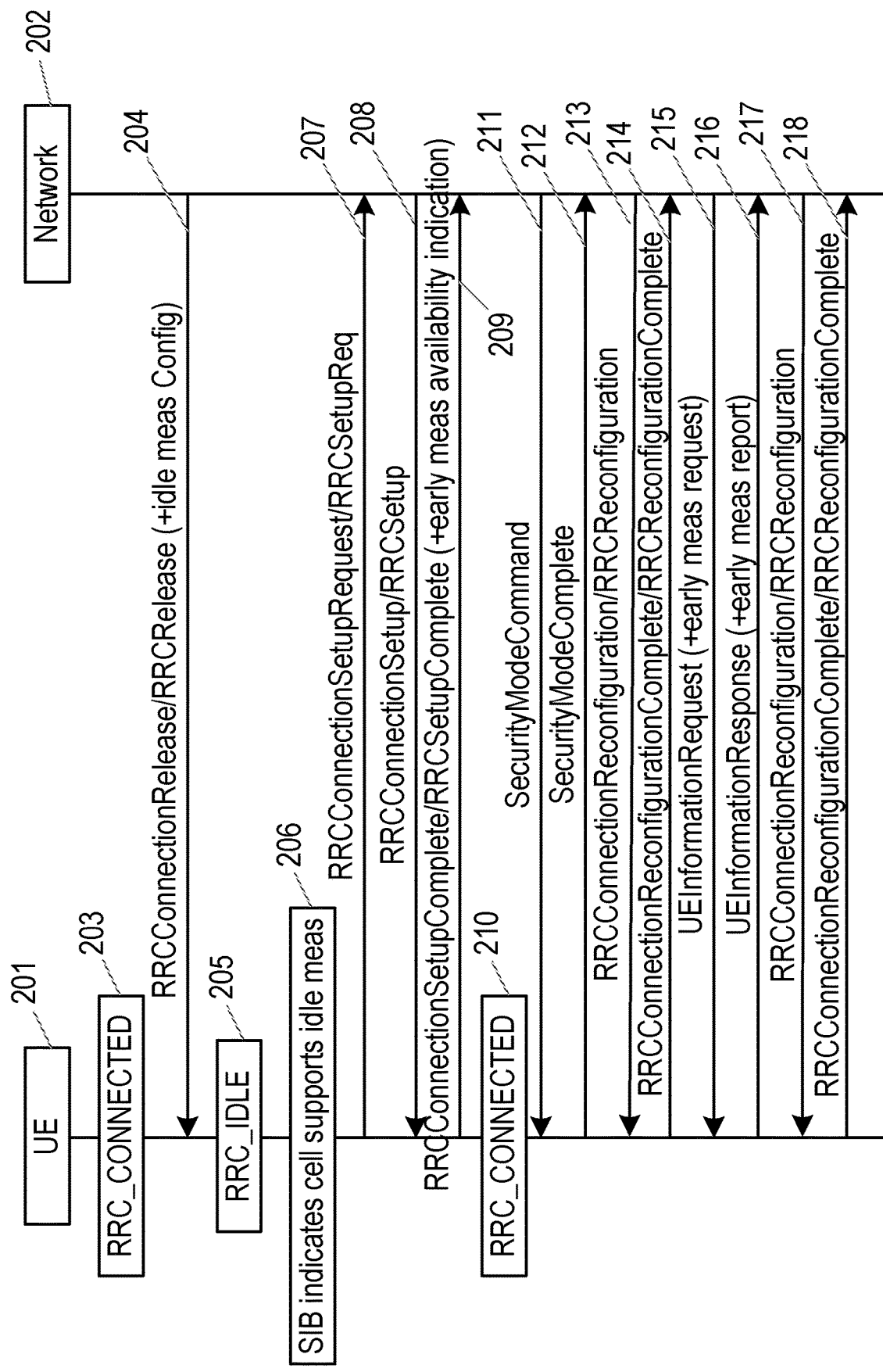
FIG. 2 illustrates the signalling for early measurement reporting in LTE/NR IDLE mode in Rel-16 during connection setup.
Figure 3:
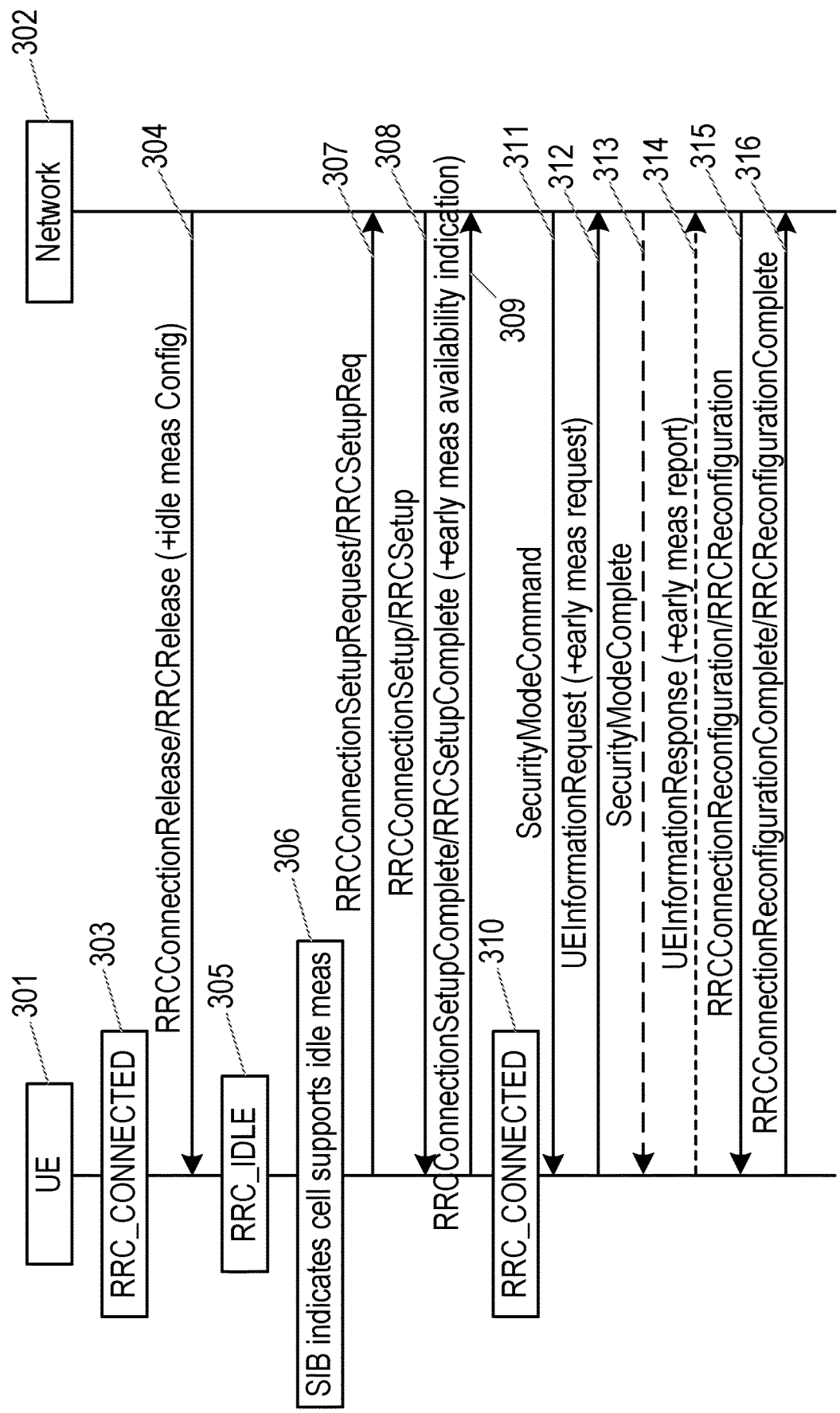
FIG. 3 illustrates alternative signalling for early measurement reporting in LTE/NR IDLE mode in Rel-16 during connection setup.
Figure 4:
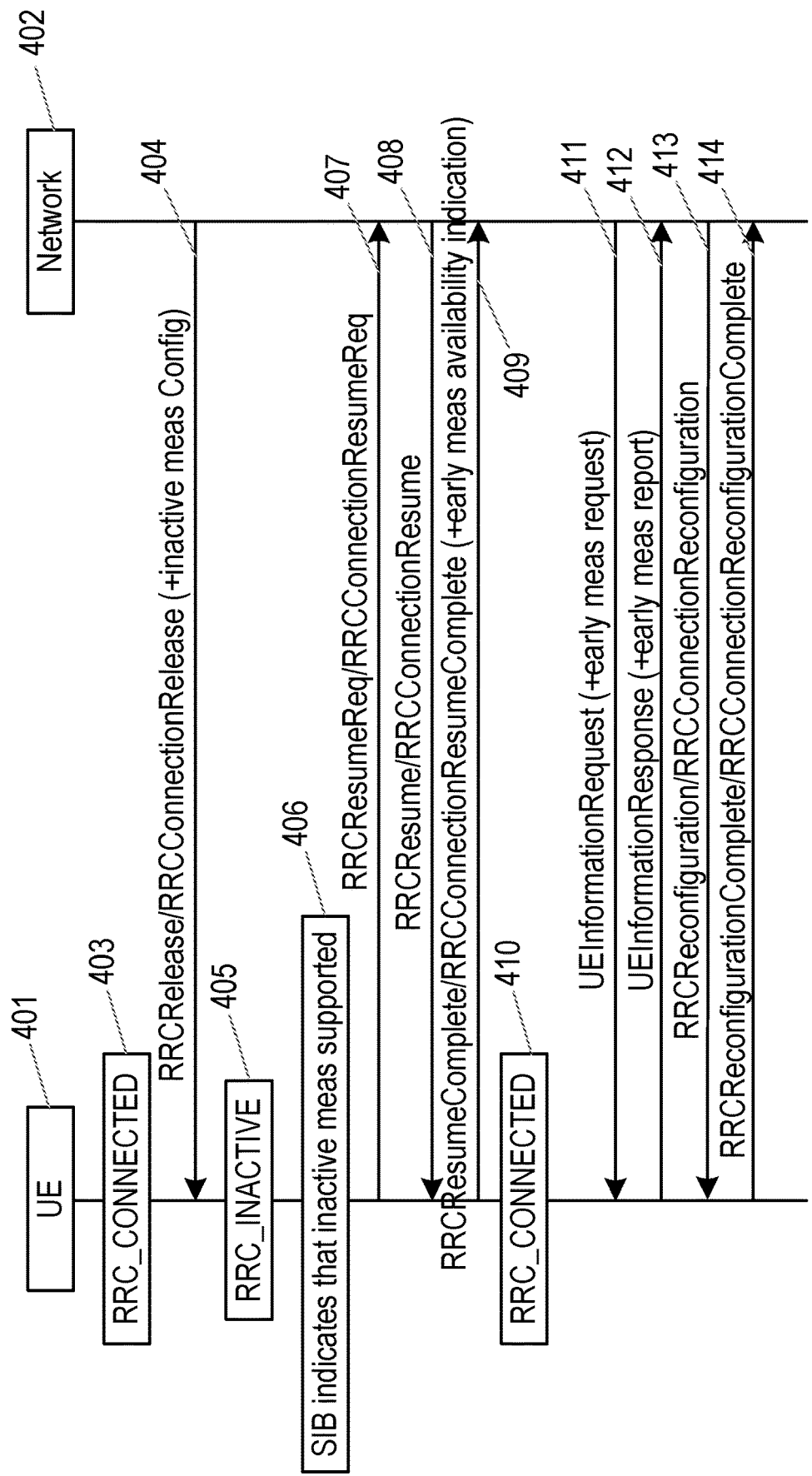
FIG. 4 illustrates signalling for early measurement reporting in LTE IDLE with suspended, LTE INACTIVE mode or NR INACTIVE mode in Rel-16.
Figure 5:
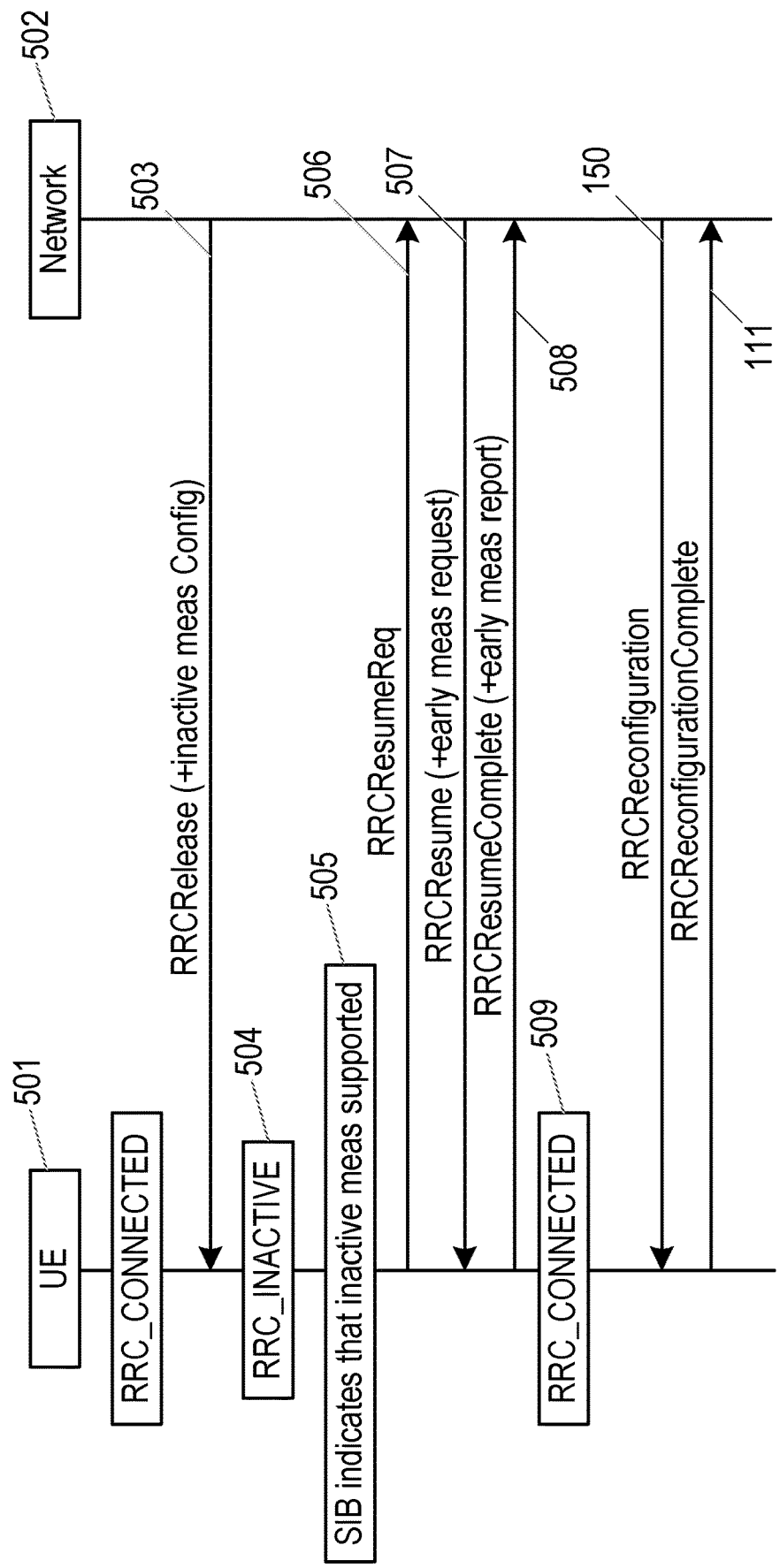
FIG. 5 illustrates signalling for early measurement reporting in NR INACTIVE mode in Rel-16.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

It should be appreciated that most of the description below refers to LTE messages and procedures. However, the methods are also applicable to future releases of New Radio (NR) (e.g. Rel-17), if further enhancements of the early measurement reporting are implemented that create some incompatibility between the Rel-16 and Rel-17 measurement configurations/results.

In parts of the description below, the term "IDLE mode measurement" is used to refer to measurements performed either in RRC_IDLE or RRC_INACTIVE mode. This is due to historical reasons that the Rel-15 LTE RRC specifications (36.331) used that terminology.

In parts of the description and examples the terminologies "Rel-15 eNB" and "Rel-16 eNB" are used. "Rel-15 eNB" refers to an eNB that is configured to operate according to the 3GPP Release 15 standards. "Rel-16 eNB" refers to an eNB that is configured to operate according to the 3GPP Release 16 standards. It should also be noted that a "Rel-15 eNB" in the case of the present disclosure can also refer to a "Rel-16 eNB" that has implemented only the Rel-15 features of early measurements (e.g. the eNB supports only LTE measurement results).

As noted above this disclosure provides mechanisms to handle early measurement reporting in a scenario where there is a mismatch (e.g. in terms of release of the standard supported or a particular feature of a release that is implemented) between the wireless device (UE) and the network (eNB). Several methods/mechanisms/modifications are proposed and can be used individually or in any suitable combination.

NETWORK EMBODIMENTS

This section discusses various methods/mechanisms/modifications for use in the network, e.g. in or by an eNB, such as a Rel-15 eNB, or a Rel-16 eNB.

Embodiment 1: Extend SIB2 with Rel-16 indication—In an embodiment, a new indication is introduced in system information, i.e. in a system information block, SIB (e.g. SIB2) for indicating the support of the Rel-16 early measurement reporting (i.e. eNB can process early measurement reports that contain measurements of NR cells).

| SystemInformationBlockType2 information element | | | |
| --- | --- | --- | --- |
| -- ASN1START | | | |
| SystemInformationBlockType2 ::= | SEQUENCE { | | |
|   ac-BarringInfo | SEQUENCE { | | |
|     ac-BarringForEmergency | BOOLEAN, | | |
|     ac-BarringForMO-Signalling | AC-BarringConfig | OPTIONAL, | -- Need OP |
|     ac-BarringForMO-Data | AC-BarringConfig | OPTIONAL | -- Need OP |
| } | | | OPTIONAL, |
| -- Need OP | | | |
|   radioResourceConfigCommon | RadioResourceConfigCommonSIB, | | |
|   ue-TimersAndConstants | UE-TimersAndConstants, | | |
|   freqInfo | SEQUENCE { | | |
|     ul-CarrierFreq | ARFCN-ValueEUTRA | OPTIONAL, | -- Need OP |
|     ul-Bandwidth | ENUMERATED {n6, n15, n25, n50, n75, n100} | | |
| | | OPTIONAL, | -- Need OP |
|     additionalSpectrumEmission | AdditionalSpectrumEmission | | |
| }, | | | |
|   mbsfn-SubframeConfigList | MBSFN-SubframeConfigList | OPTIONAL, | -- Need |
| OR | | | |
|   timeAlignmentTimerCommon | TimeAlignmentTimer, | | |
| ..., | | | |
|   lateNonCriticalExtension | OCTET STRING (CONTAINING | | |

| SystemInformationBlockType2 information element | | |
| --- | --- | --- |
| SystemInformationBlockType2-v8h0-IEs) | OPTIONAL, | |
| <<omitted parts>>, | | |
| [[    cp-EDT-r15 | ENUMERATED {true} OPTIONAL, | -- Need OR |
|        up-EDT-r15 | ENUMERATED true} OPTIONAL, | -- Need OR |
|        idleModeMeasurements-r15 | ENUMERATED {true} OPTIONAL, | -- Need OR |
|        reducedCP-LatencyEnabled-r15 | ENUMERATED {true} OPTIONAL | -- Need OR |
| ]], | | |
| [[    idleModeMeasurements-r16 | ENUMERATED {true} OPTIONAL, | -- Need OR |
| ]] | | |
| } | | |

| SystemInformationBlockType2 field descriptions |
| --- |
| idleModeMeasurements |
| This field indicates that the eNB can process indication of IDLE mode measurements from UE. |
| If SIB2 includes idleModeMeasurement-r15, it is an indication that the eNB can process IDLE mode measurements that contain LTE results from the UE. If SIB2 includes idleModeMeasurement-r16, it is an indication that the eNB can process IDLE mode measurements that contain both LTE and NR results from the UE. |

Embodiment 2: Extend UEInformationRequest with Rel-16 Indication

Embodiment 2a: Indication is used to request both LTE and NR measurements—In another or further embodiment, a separate indicator can be introduced or included in a Rel-16 UEInformationRequest (e.g. support idleModeMeasurementReq-r16) to indicate that the network wants the UE to send early measurement reports that contain both LTE and NR results. This could be implemented as, e.g.:

| UEInformationRequest message |
| --- |
| -- ASN1START |
| UEInformationRequest-r9    ::=            SEQUENCE { |
|     rrc-TransactionIdentifier          RRC-TransactionIdentifier, |
|     criticalExtensions                 CHOICE { |
|         c1                             CHOICE { |
|             ueInformationRequest-r9            UEInformationRequest-r9-IEs, |
|             spare3 NULL, spare2 NULL, spare1 NULL |
|         }, |
|         criticalExtensionsFuture       SEQUENCE { } |
|     } |
| } |
| UEInformationRequest-r9-IEs ::=    SEQUENCE { |
|     rach-ReportReq-r9                  BOOLEAN, |
|     rlf-ReportReq-r9                   BOOLEAN, |
|     nonCriticalExtension               UEInformationRequest-v930-IEs    OPTIONAL |
| } |
| UEInformationRequest-v930-IEs ::= SEQUENCE { |
|     lateNonCriticalExtension           OCTET STRING                     OPTIONAL, |
|     nonCriticalExtension               UEInformationRequest-v1020-IEs   OPTIONAL |
| } |
| UEInformationRequest-v1020-IEs ::=  SEQUENCE { |
|     logMeasReportReq-r10               ENUMERATED {true}                OPTIONAL, |
|     -- Need ON |
|     nonCriticalExtension               UEInformationRequest-v1130-IEs   OPTIONAL |
| } |
| UEInformationRequest-v1130-IEs ::= SEQUENCE { |
|     connEstFailReportReq-r11           ENUMERATED {true}                OPTIONAL, |
|     -- Need ON |
|     nonCriticalExtension               UEInformationRequest-v1250-IEs   OPTIONAL |
| } |
| UEInformationRequest-v1250-IEs :: = SEQUENCE { |
|     mobilityHistoryReportReq-r12       ENUMERATED {true}                OPTIONAL, |
|     -- Need ON |
|     nonCriticalExtension               UEInformationRequest-v1530-IEs   OPTIONAL |
| } |
| UEInformationRequest-v1530-IEs ::= SEQUENCE { |
|     idleModeMeasurementReq-r15         ENUMERATED {true}                OPTIONAL, |
|     -- Need ON |
|     flightPathInfoReq-r15              FlightPathInfoReportConfig-r15   OPTIONAL, |
|     -- Need ON |
|     nonCriticalExtension               UEInformationRequest-v16xx-IEs   OPTIONAL |
| } |

| UEInformationRequest message |
| --- |
| UEInformationRequest-v16xx-IEs ::= SEQUENCE {<br>   idleModeMeasurementReq-r16     ENUMERATED {true}     OPTIONAL,<br>   -- Need ON<br>   nonCriticalExtension            SEQUENCE { }         OPTIONAL<br>}<br>-- ASN1STOP |

| UEInformationRequest field descriptions |
| --- |
| rach-ReportReq<br>This field is used to indicate whether the UE shall report information about<br>the random access procedure.<br>idleModeMeasurementReq<br>This field is used to indicate that the UE shall report available idle mode measurements in UEInformationResponse<br>If idleModeMeasurementReq-r15 is included, it is an indication that the UE shall report IDLE mode measurements that contain only LTE results.<br>If idleModeMeasurementReq-r16 is included, it is an indication that the UE can report IDLE mode measurements that contain both LTE and NR results. |

Embodiment 2b: Indication is used to request only NR measurements—In another embodiment, a separate indicator can be introduced or included in a rel-16 UEInformationRequest (e.g. support idleModeMeasurementReq-r16) to indicate that the network wants the UE to send early measurement reports that contain only NR results. If LTE results should be included, the legacy indication can be used (i.e. the network includes both indicators if it wants both LTE and NR results). This could be implemented as e.g. (the ASN.1 structure of the UEInformationRequest message can be the same as embodiment 2a above, but in this case both idleModeMeasurementReq-r15 and idleModeMeasurementReq-r16 can be included in the same UEInformationRequest message):

| UEInformationRequest field descriptions |
| --- |
| rach-ReportReg<br>This field is used to indicate whether the UE shall report information about<br>the random access procedure.<br>idleModeMeasurementReq<br>This field is used to indicate that the UE shall report available idle mode measurements in UEInformationResponse<br>If idleModeMeasurementReq-r15 is included, it is an indication that the UE shall report IDLE mode measurements that contain LTE results.<br>If idleModeMeasurementReq-r16 is included, it is an indication that the UE can report IDLE mode measurements that contain NR results. |

UE Embodiments

This section discusses various methods/mechanisms/modifications for use in or by a User Equipment, UE. The UE can be referred to as a "Rel-16 UE", i.e. a UE that is configured to operate according to the 3GPP Release 16 standards, and specifically that is able to provide early measurement reporting of LTE and NR cells.

Embodiment 3: Extend Msg.3 with Rel-16 Indication

Embodiment 3a: Rel-16 Msg.3 indication indicates availability of both LTE and NR measurement results—In another or further embodiment, a separate indicator in a Rel-16 RRCConnectionSetupComplete or RRCConnectionResumeComplete (e.g. idleMeasAvailable-r16) can be introduced to indicate to the network that the UE has early measurements that contain both LTE and NR measurement results.

The following provides exemplary embodiments or implementations for when a separate indicator is included in a Rel-16 RRCConnectionSetupComplete:

| RRCConnectionSetupComplete message |
| --- |
| -- ASN1START<br>RRCConnectionSetupComplete ::=  SEQUENCE {<br>    rrc-TransactionIdentifier         RRC-TransactionIdentifier,<br>    criticalExtensions               CHOICE {<br>       c1                              CHOICE{<br>          rrcConnectionSetupComplete-r8         RRCConnectionSetupComplete-r8-IEs,<br>          spare3 NULL, spare2 NULL, spare1 NULL<br>       },<br>       criticalExtensionsFuture        SEQUENCE { }<br>    }<br>}<br><<omitted parts>><br>RRCConnectionSetupComplete-v1530-IEs ::= SEQUENCE {<br>    logMeasAvailableBT-r15        ENUMERATED {true}         OPTIONAL,<br>    logMeasAvailableWLAN-r15     ENUMERATED {true}         OPTIONAL,<br>    idleMeasAvailable-r15         ENUMERATED {true}         OPTIONAL,<br>    flightPathInfoAvailable-r15   ENUMERATED {true}         OPTIONAL,<br>    connectTo5GC-r15            ENUMERATED {true}         OPTIONAL,<br>    registeredAMF-r15           RegisteredAMF-r15          OPTIONAL,<br>    s-NSSAI-list-r15             SEQUENCE(SIZE (1..maxNrofS-NSSAI-r15)) OF S-NSSAI-r15 OPTIONAL, |

| RRCConnectionSetupComplete message |
| --- |
| ng-5G-S-TMSI-Bits-r15            CHOICE {<br>    ng-5G-S-TMSI-r15              NG-5G-S-TMSI-r15,<br>    ng-5G-S-TMSI-Part2-r15      BIT STRING (SIZE (8))<br>}<br>OPTIONAL,<br>nonCriticalExtension              RRCConnectionSetupComplete-v1540-IEs<br>OPTIONAL<br>}<br>RRCConnectionSetupComplete-v1540-IEs ::= SEQUENCE {<br>  gummei-Type-v1540             ENUMERATED {mappedFrom5G}   OPTIONAL,<br>  guami-Type-r15                  ENUMERATED {native, mapped}  OPTIONAL,<br>  nonCriticalExtension             RRCConnectionSetupComplete-v16xx-IEs<br>  OPTIONAL<br>}<br>RRCConnectionSetupComplete-v16xx-IEs ::= SEQUENCE {<br>  idleMeasAvailable-r16           ENUMERATED {true}         OPTIONAL,<br>  nonCriticalExtension             RRCConnectionSetupComplete-v1540-IEs<br>  OPTIONAL<br>}<br>-- ASN1STOP |

| RRCConnection SetupComplete field descriptions |
| --- |
| idleMeasAvailable<br>Indication that the UE has idle mode measurement report available.<br>If idleMeasAvailable-r15 is included, it is an indication that the UE has IDLE mode measurements that contain only LTE results.<br>If idleMeasAvailable-r16 is included, it is an indication that the UE has IDLE mode measurements that contain both LTE and NR results. |

If a single indication is used in SIB2, the procedures could be updated to e.g.:

```
1> set the content of RRCConnectionSetupComplete message as follows:
    <<skipped parts>>
    2> except for NB-IoT:
        <<skipped parts>>
        3> if the SIB2 contains idleModeMeasurements
            4>if the UE has IDLE mode measurement information available in
              VarMeasIdleReport-r15:
                5> include the idleMeasAvailable-r15;
            4> else if the UE has IDLE mode measurement information
              available in VarMeasIdleReport-r16:
                5> include the idleMeasAvailable-r16;
```

If a new indication is introduced in SIB2 (as in network embodiment 1), the procedures could be updated to e.g.:

```
1> set the content of RRCConnectionSetupComplete message as follows:
    <<skipped parts>>
    2> except for NB-IoT:
        <<skipped parts>>
        3> if the SIB2 contains idleModeMeasurements-r15:
            4> if the UE has IDLE mode measurement information available in
              VarMeasIdleReport
              (i.e. VarMeasIdleReport-r15 or VarMeasIdleReport-r16) :
                5> include the idleMeasAvailable-r15;
        3> else if the SIB2 contains idleModeMeasurements-r16
            4>if the UE has IDLE mode measurement information available in
              VarMeasIdleReport-r15
                5> include the idleMeasAvailable-r15;
            4>else if the UE has IDLE mode measurement information
              available in VarMeasIdleReport-r16
                5> include the idleMeasAvailable-r16;
```

The following provides exemplary embodiments or implementations for when a separate indicator is included in a Rel-16 RRCConnectionResumeComplete:

| RRCConnectionResumeComplete message |
| --- |
| -- ASN1 START<br>RRCConnectionResumeComplete-r13 ::= SEQUENCE {<br>  rrc-TransactionIdentifier         RRC-TransactionIdentifier,<br>  criticalExtensions              CHOICE {<br>    rrcConnectionResumeComplete-r13    RRCConnectionResumeComplete-r13-IEs,<br>    criticalExtensionsFuture           SEQUENCE { }<br>  }<br>}<br><<Omitted parts>><br>}<br>RRCConnectionResumeComplete-v1530-IEs ::= SEQUENCE {<br>  logMeasAvailableBT-r15        ENUMERATED {true}      OPTIONAL,<br>  logMeasAvailableWLAN-r15      ENUMERATED {true}      OPTIONAL,<br>  idleMeasAvailable-r15         ENUMERATED {true}      OPTIONAL,<br>  flightPathInfoAvailable-r15      ENUMERATED {true}      OPTIONAL,<br>  nonCriticalExtension           RRCConnectionResumeComplete-v16xx-IEs<br>  OPTIONAL<br>} |

| RRCConnectionResumeComplete message |
|---|
| RRCConnectionResumeComplete-v16xx-IEs ::= SEQUENCE {<br>   idleMeasAvailable-r16              ENUMERATED {true}    OPTIONAL,<br>   nonCriticalExtension              SEQUENCE { }          OPTIONAL<br>}<br>-- ASN1STOP |

| RRCConnectionResumeComplete field descriptions |
|---|
| idleMeasAvailable<br>Indication that the UE has idle mode measurement report available.<br>If idleMeasAvailable-r15 is included, it is an indication that the UE has IDLE mode measurements that contain only LTE results.<br>If idleMeasAvailable-r16 is included, it is an indication that the UE has IDLE mode measurements that contain both LTE and NR results. |

If a single indication is used in SIB, the procedures could be implemented as e.g.:

```
1> set the content of RRCConnectionResumeComplete message as
follows:
    <<skipped part>>
    2> except for NB-IoT:
        <<skipped parts>>
        3> if the SIB2 contains idleModeMeasurements
            4>if the UE has IDLE mode measurement information available in
               VarMeasIdleReport-r15:
                5> include the idleMeasAvailable-r15;
            4> else if the UE has IDLE mode measurement information
               available in VarMeasIdleReport-r16:
                5> include the idleMeasAvailable-r16;
```

If a separate indication is used in SIB for the Rel-16 results, the procedures could be implemented as e.g.:

```
1> set the content of RRCConnectionResumeComplete message as
follows:
    <<skipped parts>>
    2> except for NB-IoT:
        <<skipped parts>>
        3> if the SIB2 contains idleModeMeasurements-r15
            4> if the UE has IDLE mode measurement information available in
               VarMeasIdleReport
               (i.e. VarMeasIdleReport-r15 or VarMeasIdleReport-r16):
                5> include the idleMeasAvailable-r15;
        3> else if the SIB2 contains idleModeMeasurements-r16
            4>if the UE has IDLE mode measurement information available in
               VarMeasIdleReport-r15
                5> include the idleMeasAvailable-r15;
            4>else if the UE has IDLE mode measurement information
               available in VarMeasIdleReport-r16
                5> include the idleMeasAvailable-r16;
```

Embodiment 3b: Rel-16 Msg.3 indication indicates availability of only NR measurement results—In another or further embodiment, a separate indicator in a Rel-16 RRC-ConnectionSetupComplete or RRCConnectionResumeComplete (e.g. idleMeasAvailable-r16) can be introduced or included to indicate to the network that the UE has early measurements that contain NR results. If LTE results are available, the UE can use the existing legacy indication (i.e. both indicators included).

The following provides exemplary embodiments or implementations for when a separate indicator is included in a Rel-16 RRCConnectionSetupComplete:

The ASN.1 for these embodiments can be the same as embodiment 3a above, but in these embodiments both idleMeasurementAvailable-r15 and idleMeasurementAvailable-r16 can be included in the same RRCConnectionSetupComplete message:

| RRCConnectionSetupComplete field descriptions |
|---|
| idleMeasAvailable<br>Indication that the UE has idle mode measurement report available.<br>If idleMeasAvailable-r15 is included, it is an indication that the UE has IDLE mode measurements that contain LTE results.<br>If idleMeasAvailable-r16 is included, it is an indication that the UE has IDLE mode measurements that contain NR results. |

If a single indication is used in SIB2, the procedures could be updated to e.g.:

```
1> set the content of RRCConnectionSetupComplete message as follows:
    <<skipped parts>>
    2> except for NB-IoT:
        <<skipped parts>>
        3> if the SIB2 contains idleModeMeasurements
            4>if the UE has IDLE mode measurement information available in
               VarMeasIdleReport-r15:
                5> include the idleMeasAvailable-r15;
            4> if the UE has IDLE mode measurement information available in
               VarMeasIdleReport-r16:
                5> include the idleMeasAvailable-r16;
```

The above means that if UE has both LTE and NR measurements, it will include both indications.

If a new indication is introduced in SIB2 (as in network embodiment 1), the procedures could be updated to e.g.:

```
1> set the content of RRCConnectionSetupComplete message as follows:
    <<skipped parts>>
    2> except for NB-IoT:
        <<skipped parts>
        3> if the SIB2 contains idleModeMeasurements-r15:
            4> if the UE has IDLE mode measurement information available in
               VarMeasIdleReport-r15:
                5> include the idleMeasAvailable-r15;
        3> if the SIB2 contains idleModeMeasurements-r16
            4> if the UE has IDLE mode measurement information available in
               VarMeasIdleReport-r16
                5> include the idleMeasAvailable-r16;
```

In the above example, it has been assumed that the SIB can include both idleModeMeasurements-r15 and idleModeMeasurements-r16 to indicate that it wants the UE to report the LTE and NR results, respectively. Another possibility is for the SIB to indicate idleModeMeasurements-r15 when it wants the UE to report only LTE results, and indicate idleModeMeasurements-r16 when it wants the UE to report both LTE and NR results. In such a case, the procedure can be as follows:

```
1> set the content of RRCConnectionSetupComplete message as follows:
    <<skipped parts>>
    2> except for NB-IoT:
        <<skipped parts>>
        3> if the SIB2 contains idleModeMeasurements-r15:
            4> if the UE has IDLE mode measurement information available in
               VarMeasIdleReport-r15:
                5> include the idleMeasAvailable-r15;
        3> else if the SIB2 contains idleModeMeasurements-r16
            4> if the UE has IDLE mode measurement information available in
               VarMeasIdleReport-r15
                5> include the idleMeasAvailable-r15;
            4> if the UE has IDLE mode measurement information available in
               VarMeasIdleReport-r16
                5> include the idleMeasAvailable-r16;
```

The following provides exemplary embodiments or implementations for when a separate indicator is included in a Rel-16 RRCConnectionResumeComplete.

The ASN.1 for this case can be the same as embodiment 3a above, but in this case both idleMeasurementAvailable-r15 and idleMeasurementAvailable-r16 can be included in the same RRCConnectionResumeComplete message:

| RRCConnectionResumeComplete field descriptions |
| --- |
| idleMeasAvailable<br>Indication that the UE has idle mode measurement report available.<br>If idleMeasAvailable-r15 is included, it is an indication that the UE has IDLE mode measurements that contain LTE results.<br>If idleMeasAvailable-r16 is included, it is an indication that the UE has IDLE mode measurements that contain NR results. |

If a single indication is used in SIB, the procedures could be implemented as e.g.:

```
1> set the content of RRCConnectionResumeComplete message as
follows:
    <<skipped part>>
    2> except for NB-IoT:
        <<skipped parts>>
        3> if the SIB2 contains idleModeMeasurements
            4>if the UE has IDLE mode measurement information available in
               VarMeasIdleReport-r15:
                5> include the idleMeasAvailable-r15;
            4> if the UE has IDLE mode measurement information available in
               VarMeasIdleReport-r16:
                5> include the idleMeasAvailable-r16;
```

If a new indication is used in SIB2 (as in network embodiment 1), the procedures could be implemented as e.g.:

```
1> set the content of RRCConnectionResumeComplete message as
follows:
    <<skipped parts>>
    2> except for NB-IoT:
        <<skipped parts>>
        3> if the SIB2 contains idleModeMeasurements-r15:
            4> if the UE has IDLE mode measurement information available in
               VarMeasIdleReport:
                5> include the idleMeasAvailable-r15;
        3> if the SIB2 contains idleModeMeasurements-r16:
            4> if the UE has IDLE mode measurement information available in
               VarMeasIdleReport-r16:
                5> include the idleMeasAvailable-r16;
```

In the above example, it has been assumed that the SIB can include both idleModeMeasurements-r15 and idleModeMeasurements-r16 to indicate that it wants the UE to report the LTE and NR results, respectively. Another possibility is for the SIB to indicate idleModeMeasurements-r15 when it wants the UE to report only LTE results, and idleModeMeasurements-r16 when it wants the UE to report both LTE and NR results. In such a case, the procedure can be as follows:

```
1> set the content of RRCConnectionResumeComplete message as
follows:
    <<skipped parts>>
    2> except for NB-IoT:
        <<skipped parts>>
        3> if the SIB2 contains idleModeMeasurements-r15:
            4> if the UE has IDLE mode measurement information available in
               VarMeasIdleReport-r15:
                5> include the idleMeasAvailable-r15;
        3> else if the SIB2 contains idleModeMeasurements-r16
            4> if the UE has IDLE mode measurement information available in
               VarMeasIdleReport-r15
                5> include the idleMeasAvailable-r15;
            4> if the UE has IDLE mode measurement information available in
               VarMeasIdleReport-r16
                5> include the idleMeasAvailable-r16;
```

Embodiment 4: Introduce New UE Variable that Will Contain the Idle Mode Measurement Results for Both LTE and NR In another or further embodiment, the UE can have one Rel-16 variable (e.g. VarMeasIdleReport-r16) that can use to store both the LTE and NR measurement results. If the UE has been configured with a Rel-16 early measurement configuration and has Rel-16 early measurement results that contain both LTE and NR results, while the eNB that the UE is resuming or establishing the connection to supports only Rel-15 early measurements (as indicated either the SIB or in the received UEInformationRequest), the UE can either:

Include only the LTE results in the early measurement report; or

Not send any early measurement report.

Since the current procedures instruct the UE to include the entire VarMeasIdleReport in the UEInformationResponse, the procedures need to be updated to distinguish between the NR and LTE results.

Embodiment 4a: Rel-16 indication in UEInformationRequest requests both LTE and NR measurements—This could be implemented as follows (assuming the network implements two separate indicators for Rel-15 and Rel-16 measurements in the UEInformationRequest as discussed in network embodiment 2a):

5.6.5.3 Reception of the UEInformationRequest message
Upon receiving the UEInformationRequest message, the UE shall, only after successful security activation:
<<skipped parts>>
1> if the idleModeMeasurementReq-r15 is included in the UEInformationRequest:
  2> if the UE has stored VarMeasIdleReport-r15:
    3> set the measResultListIdle in the UEInformationResponse message to the value of
      measReportIdle in the VarMeasIdleReport-r15;
  2> else if the UE has stored VarMeasIdleReport-r16:
    3> set the measResultListIdle in the UEInformationResponse message to the value of
      measReportIdleEUTRA in the VarMeasIdleReport-r16; <<Here only the
      measReportIdle EUTRA is put into the result>>
1> else if the idleModeMeasurementReq-r16 is included in the UEInformationRequest:
  2> if the UE has stored VarMeasIdleReport-r15:
    3> set the measResultListIdleEUTRA in the UEInformationResponse message to the value
      of measReportIdleEUTRA in the VarMeasIdleReport-r15; <<Here only the EUTRA
      part of UEInformationResponse is populated>>
  2> else if the UE has stored VarMeasIdleReport-r16:
    3> set the measResultListIdleEUTRA in the UEInformationResponse message to the value
      of measReportIdleEUTRA in the VarMeasIdleReport-r16;
    3> set the measResultListIdleNR in the UEInformationResponse message to the value of
      measReportIdleNR in the VarMeasIdleReport-r16; <<Here both the EUTRA and NR
      part of UEInformationResponse are populated>>

Embodiment 4b: Rel-16 indication in UEInformationRequest requests only NR measurements—In another or further embodiment, the network can indicate in UEInformationRequest using two indicators, idleModeMeasurementReq-r15 for the LTE measurements, and idleModeMeasurementReq-r16 for the NR measurements (i.e. based on network embodiment 2b). This could be implemented e.g. as:

5.6.5.3 Reception of the UEInformationRequest message
Upon receiving the UEInformationRequest message, the UE shall, only after successful security activation:
<<skipped parts>>
1> if the idleModeMeasurementReq-r15 is included in the UEInformationRequest:
  2> if the UE has stored VarMeasIdleReport-r15:
    3> set the measResultListIdleEUTRA in the UEInformationResponse message to the value
      of measReportIdle in the VarMeasIdleReport-r15;
  2> else if the UE has stored VarMeasIdleReport-r16:
    3> set the measResultListIdleEUTRA in the UEInformationResponse message to the value
      of measReportIdleEUTRA in the VarMeasIdleReport-r16;
1> if the idleModeMeasurementReq-r16 is included in the UEInformationRequest:
  2> if the UE has stored VarMeasIdleReport-r16:
    3> set the measResultListIdleNR in the UEInformationResponse message to the value of
      measReportIdleNR in the VarMeasIdleReport-r16;

Embodiment 5: Introduce New UE Variable which Contains Only NR Measurement Results, while Reusing Existing UE Variable for LTE Measurement Results In another or further embodiment, the Rel-16 early measurement results may only contain NR results. In that case the UE would use the Rel-15 UE variable (VarMeasIdleReport-r15) to store the LTE measurement results and a separate Rel-16 UE variable (e.g. VarMeasIdleReport-r16) to store the NR measurement results.

If the UE has been configured with Rel-16 early measurement configuration and has Rel-16 early measurement results that contain both LTE and NR results while the eNB that the UE is resuming or establishing the connection to supports only Rel-15 early measurements (as indicated either the SIB or in the received UEInformationRequest), the UE may only include the VarMeasIdleReport-r15 in the early measurement report. If the target eNB supports Rel-16 early measurements, the UE can include both VarMeasIdleReport-r15 and VarMeasIdleReport-r16 in the early measurement report.

Embodiment 5a: Rel-16 indication requests both LTE and NR measurements—This could be implemented as follows (assuming the network implements two separate indicators for Rel-15 and Rel-16 measurements in the UEInformationRequest as discussed in network embodiment 2a):

5.6.5.3 Reception of the UEInformationRequest message
Upon receiving the UEInformationRequest message, the UE shall, only after successful security activation:
<<skipped parts>>
1> if the UE has stored VarMeasIdleReport-r15:
  2> if idleModeMeasurementReq-r15 or idleModeMeasurementReq-r16 is included in the
    UEInformationRequest:
    3>set the measResultListIdle-r15 in the UEInformationResponse message to the value of
      measReportIdle-r15 in the VarMeasIdleReport-r15;
    3>discard the VarMeasIdleReport-r15 upon successful delivery of the
      UEInformationResponse message confirmed by lower layers;
1> else if the UE has stored VarMeasIdleReport-r16:

2>set the measResultListIdle-r15 in the UEInformationResponse message to the value of
  measReportIdle-r15 in the VarMeasIdleReport-r15; <<This applies for both the Rel-15
  and Rel-16 eNB>>
2> if idleModeMeasurementReq-r16 is included in the UEInformationRequest:
  3> set the measResultListIdle-r16 in the UEInformationResponse message to the value of
    measReportIdle-r16 in the VarMeasIdleReport-r16;
2>discard the VarMeasIdleReport-r15 and VarMeasIdleReport-r16 upon successful delivery of
  the UEInformationResponse message confirmed by lower layers;

Embodiment 5b: Rel-16 indication requests only NR measurements—This could be implemented as follows (assuming the network implements two separate indicators for Rel-15 and Rel-16 measurements in the UEInformationRequest as discussed in network embodiment 2b):

5.6.5.3 Reception of the UEInformationRequest message
Upon receiving the UEInformationRequest message, the UE shall, only after successful security activation:
  <<skipped parts>>
  1> if the UE has stored VarMeasIdleReport-r15:
    2> if idleModeMeasurementReq-r15 is included in the UEInformationRequest:
      3>set the measResultListIdle-r15 in the UEInformationResponse message to the value of
        measReportIdle-r15 in the VarMeasIdleReport-r15;
  1> if the UE has stored VarMeasIdleReport-r16:
    2> if idleModeMeasurementReq-r16 is included in the UEInformationRequest:
      3> set the measResultListIdle-r16 in the UEInformationResponse message to the value of
        measReportIdle-r16 in the VarMeasIdleReport-r16;
  1>discard the stored VarMeasIdleReport-r15 and VarMeasIdleReport-r16, if any, upon successful
    delivery of the UEInformationResponse message confirmed by lower layers;

Thus, the various embodiments set out above may enable inter-operability between a Rel-15/Rel-16 UE and a Rel-15/Rel-16 eNB with regard to early measurement reporting. Without the methods proposed, a Rel-16 UE may end up sending early measurement reports that contain NR results and as such may not be understood/compiled by a Rel-15 eNB. This could effectively render the early measurement enhancement feature useless for some of the UEs in deployments that contain a mix of Rel-15 and Rel-16 eNBs, resulting in a degraded end user performance, as faster CA/DC setup will not be possible.

Figure 6:
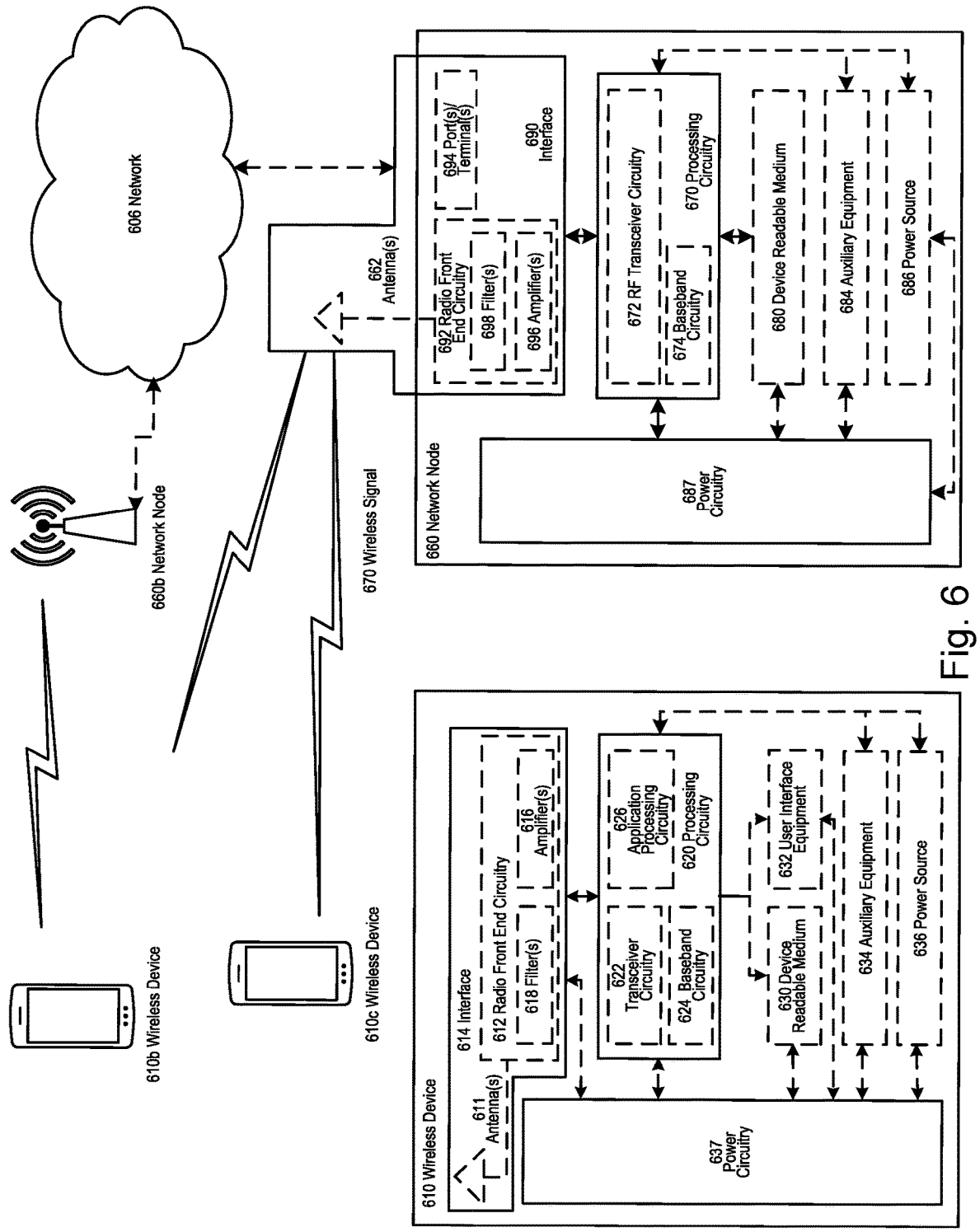
FIG. 6 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 606, network nodes 660 and 660b, and WDs 610, 610b, and 610c. In practice, a wireless network may further include any additional elements suitable to support communication between wireless devices or between a wireless device and another communication device, such as a landline telephone, a service provider, or any other network node or end device. Of the illustrated components, network node 660 and wireless device (WD) 610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 660 and WD 610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 660 includes processing circuitry 670, device readable medium 680, interface 690, auxiliary equipment 684, power source 686, power circuitry 687, and antenna 662. Although network node 660 illustrated in the example wireless network of FIG. 6 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 660 are depicted as single boxes located within a larger box, or nested within multiple boxes, in practice, a network node may comprise multiple different physical components that make up a single illustrated component (e.g., device readable medium 680 may comprise multiple separate hard drives as well as multiple RAM modules).

Similarly, network node 660 may be composed of multiple physically separate components (e.g., a NodeB component and a RNC component, or a BTS component and a BSC component, etc.), which may each have their own respective components. In certain scenarios in which network node 660 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 660 may be configured to support multiple radio access technologies (RATs). In such embodiments, some components may be duplicated (e.g., separate device readable medium 680 for the different RATs) and some components may be reused (e.g., the same antenna 662 may be shared by the RATs). Network node 660 may also include multiple sets of the various illustrated components for different wireless technologies integrated into network node 660, such as, for example, GSM, WCDMA, LTE, NR, WiFi, or Bluetooth wireless technologies. These wireless technologies may be integrated into the same or different chip or set of chips and other components within network node 660.

Processing circuitry 670 is configured to perform any determining, calculating, or similar operations (e.g., certain obtaining operations) described herein as being provided by a network node. These operations performed by processing circuitry 670 may include processing information obtained by processing circuitry 670 by, for example, converting the obtained information into other information, comparing the obtained information or converted information to information stored in the network node, and/or performing one or more operations based on the obtained information or converted information, and as a result of said processing making a determination.

Processing circuitry 670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 660 components, such as device readable medium 680, network node 660 functionality. For example, processing circuitry 670 may execute instructions stored in device readable medium 680 or in memory within processing circuitry 670. Such functionality may include providing any of the various wireless features, functions, or benefits discussed herein. In some embodiments, processing circuitry 670 may include a system on a chip (SOC).

In some embodiments, processing circuitry 670 may include one or more of radio frequency (RF) transceiver circuitry 672 and baseband processing circuitry 674. In some embodiments, radio frequency (RF) transceiver circuitry 672 and baseband processing circuitry 674 may be on separate chips (or sets of chips), boards, or units, such as radio units and digital units. In alternative embodiments, part or all of RF transceiver circuitry 672 and baseband processing circuitry 674 may be on the same chip or set of chips, boards, or units In certain embodiments, some or all of the functionality described herein as being provided by a network node, base station, eNB or other such network device may be performed by processing circuitry 670 executing instructions stored on device readable medium 680 or memory within processing circuitry 670. In alternative embodiments, some or all of the functionality may be provided by processing circuitry 670 without executing instructions stored on a separate or discrete device readable medium, such as in a hard-wired manner. In any of those embodiments, whether executing instructions stored on a device readable storage medium or not, processing circuitry 670 can be configured to perform the described functionality. The benefits provided by such functionality are not limited to processing circuitry 670 alone or to other components of network node 660, but are enjoyed by network node 660 as a whole, and/or by end users and the wireless network generally.

Device readable medium 680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 670. Device readable medium 680 may store any suitable instructions, data or information, including a computer program, software, an application including one or more of logic, rules, code, tables, etc. and/or other instructions capable of being executed by processing circuitry 670 and, utilized by network node 660. Device readable medium 680 may be used to store any calculations made by processing circuitry 670 and/or any data received via interface 690. In some embodiments, processing circuitry 670 and device readable medium 680 may be considered to be integrated.

Interface 690 is used in the wired or wireless communication of signalling and/or data between network node 660, network 606, and/or WDs 610. As illustrated, interface 690 comprises port(s)/terminal(s) 694 to send and receive data, for example to and from network 606 over a wired connection. Interface 690 also includes radio front end circuitry 692 that may be coupled to, or in certain embodiments a part of, antenna 662. Radio front end circuitry 692 comprises filters 698 and amplifiers 696. Radio front end circuitry 692 may be connected to antenna 662 and processing circuitry 670. Radio front end circuitry may be configured to condition signals communicated between antenna 662 and processing circuitry 670. Radio front end circuitry 692 may receive digital data that is to be sent out to other network nodes or WDs via a wireless connection. Radio front end circuitry 692 may convert the digital data into a radio signal having the appropriate channel and bandwidth parameters using a combination of filters 698 and/or amplifiers 696. The radio signal may then be transmitted via antenna 662. Similarly, when receiving data, antenna 662 may collect radio signals which are then converted into digital data by radio front end circuitry 692. The digital data may be passed to processing circuitry 670. In other embodiments, the interface may comprise different components and/or different combinations of components.

In certain alternative embodiments, network node 660 may not include separate radio front end circuitry 692, instead, processing circuitry 670 may comprise radio front end circuitry and may be connected to antenna 662 without separate radio front end circuitry 692. Similarly, in some embodiments, all or some of RF transceiver circuitry 672 may be considered a part of interface 690. In still other embodiments, interface 690 may include one or more ports or terminals 694, radio front end circuitry 692, and RF transceiver circuitry 672, as part of a radio unit (not shown), and interface 690 may communicate with baseband processing circuitry 674, which is part of a digital unit (not shown).

Antenna 662 may include one or more antennas, or antenna arrays, configured to send and/or receive wireless signals. Antenna 662 may be coupled to radio front end circuitry 690 and may be any type of antenna capable of transmitting and receiving data and/or signals wirelessly. In some embodiments, antenna 662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 662 may be separate from network node 660 and may be connectable to network node 660 through an interface or port.

Antenna 662, interface 690, and/or processing circuitry 670 may be configured to perform any receiving operations and/or certain obtaining operations described herein as being performed by a network node. Any information, data and/or signals may be received from a wireless device, another network node and/or any other network equipment. Similarly, antenna 662, interface 690, and/or processing circuitry 670 may be configured to perform any transmitting operations described herein as being performed by a network node. Any information, data and/or signals may be transmitted to a wireless device, another network node and/or any other network equipment.

Power circuitry 687 may comprise, or be coupled to, power management circuitry and is configured to supply the components of network node 660 with power for performing the functionality described herein. Power circuitry 687 may receive power from power source 686. Power source 686 and/or power circuitry 687 may be configured to provide power to the various components of network node 660 in a form suitable for the respective components (e.g., at a voltage and current level needed for each respective component). Power source 686 may either be included in, or external to, power circuitry 687 and/or network node 660. For example, network node 660 may be connectable to an external power source (e.g., an electricity outlet) via an input circuitry or interface such as an electrical cable, whereby the external power source supplies power to power circuitry 687. As a further example, power source 686 may comprise a source of power in the form of a battery or battery pack which is connected to, or integrated in, power circuitry 687. The battery may provide backup power should the external power source fail. Other types of power sources, such as photovoltaic devices, may also be used.

Alternative embodiments of network node 660 may include additional components beyond those shown in FIG. 6 that may be responsible for providing certain aspects of the network node's functionality, including any of the functionality described herein and/or any functionality necessary to support the subject matter described herein. For example, network node 660 may include user interface equipment to allow input of information into network node 660 and to allow output of information from network node 660. This may allow a user to perform diagnostic, maintenance, repair, and other administrative functions for network node 660.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 610 includes antenna 611, interface 614, processing circuitry 620, device readable medium 630, user interface equipment 632, auxiliary equipment 634, power source 636 and power circuitry 637. WD 610 may include multiple sets of one or more of the illustrated components for different wireless technologies supported by WD 610, such as, for example, GSM, WCDMA, LTE, NR, WiFi, WiMAX, or Bluetooth wireless technologies, just to mention a few. These wireless technologies may be integrated into the same or different chips or set of chips as other components within WD 610.

Antenna 611 may include one or more antennas or antenna arrays, configured to send and/or receive wireless signals, and is connected to interface 614. In certain alternative embodiments, antenna 611 may be separate from WD 610 and be connectable to WD 610 through an interface or port. Antenna 611, interface 614, and/or processing circuitry 620 may be configured to perform any receiving or transmitting operations described herein as being performed by a WD. Any information, data and/or signals may be received from a network node and/or another WD. In some embodiments, radio front end circuitry and/or antenna 611 may be considered an interface.

As illustrated, interface 614 comprises radio front end circuitry 612 and antenna 611. Radio front end circuitry 612 comprise one or more filters 618 and amplifiers 616. Radio front end circuitry 614 is connected to antenna 611 and processing circuitry 620, and is configured to condition signals communicated between antenna 611 and processing circuitry 620. Radio front end circuitry 612 may be coupled to or a part of antenna 611. In some embodiments, WD 610 may not include separate radio front end circuitry 612; rather, processing circuitry 620 may comprise radio front end circuitry and may be connected to antenna 611. Similarly, in some embodiments, some or all of RF transceiver circuitry 622 may be considered a part of interface 614. Radio front end circuitry 612 may receive digital data that is to be sent out to other network nodes or WDs via a wireless connection. Radio front end circuitry 612 may convert the digital data into a radio signal having the appropriate channel and bandwidth parameters using a combination of filters 618 and/or amplifiers 616. The radio signal may then be transmitted via antenna 611. Similarly, when receiving data, antenna 611 may collect radio signals which are then converted into digital data by radio front end circuitry 612. The digital data may be passed to processing circuitry 620. In other embodiments, the interface may comprise different components and/or different combinations of components.

Processing circuitry 620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 610 components, such as device readable medium 630, WD 610 functionality. Such functionality may include providing any of the various wireless features or benefits discussed herein. For example, processing circuitry 620 may execute instructions stored in device readable medium 630 or in memory within processing circuitry 620 to provide the functionality disclosed herein.

As illustrated, processing circuitry 620 includes one or more of RF transceiver circuitry 622, baseband processing circuitry 624, and application processing circuitry 626. In other embodiments, the processing circuitry may comprise different components and/or different combinations of components. In certain embodiments processing circuitry 620 of WD 610 may comprise a SOC. In some embodiments, RF transceiver circuitry 622, baseband processing circuitry 624, and application processing circuitry 626 may be on separate chips or sets of chips. In alternative embodiments, part or all of baseband processing circuitry 624 and application processing circuitry 626 may be combined into one chip or set of chips, and RF transceiver circuitry 622 may be on a separate chip or set of chips. In still alternative embodiments, part or all of RF transceiver circuitry 622 and baseband processing circuitry 624 may be on the same chip or set of chips, and application processing circuitry 626 may be on a separate chip or set of chips. In yet other alternative embodiments, part or all of RF transceiver circuitry 622, baseband processing circuitry 624, and application processing circuitry 626 may be combined in the same chip or set of chips. In some embodiments, RF transceiver circuitry 622 may be a part of interface 614. RF transceiver circuitry 622 may condition RF signals for processing circuitry 620.

In certain embodiments, some or all of the functionality described herein as being performed by a WD may be provided by processing circuitry 620 executing instructions stored on device readable medium 630, which in certain embodiments may be a computer-readable storage medium. In alternative embodiments, some or all of the functionality may be provided by processing circuitry 620 without executing instructions stored on a separate or discrete device readable storage medium, such as in a hard-wired manner. In any of those particular embodiments, whether executing instructions stored on a device readable storage medium or not, processing circuitry 620 can be configured to perform the described functionality. The benefits provided by such functionality are not limited to processing circuitry 620 alone or to other components of WD 610, but are enjoyed by WD 610 as a whole, and/or by end users and the wireless network generally.

Processing circuitry 620 may be configured to perform any determining, calculating, or similar operations (e.g., certain obtaining operations) described herein as being performed by a WD. These operations, as performed by processing circuitry 620, may include processing information obtained by processing circuitry 620 by, for example, converting the obtained information into other information, comparing the obtained information or converted information to information stored by WD 610, and/or performing one or more operations based on the obtained information or converted information, and as a result of said processing making a determination.

Device readable medium 630 may be operable to store a computer program, software, an application including one or more of logic, rules, code, tables, etc. and/or other instructions capable of being executed by processing circuitry 620. Device readable medium 630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 620. In some embodiments, processing circuitry 620 and device readable medium 630 may be considered to be integrated.

User interface equipment 632 may provide components that allow for a human user to interact with WD 610. Such interaction may be of many forms, such as visual, audial, tactile, etc. User interface equipment 632 may be operable to produce output to the user and to allow the user to provide input to WD 610. The type of interaction may vary depending on the type of user interface equipment 632 installed in WD 610. For example, if WD 610 is a smart phone, the interaction may be via a touch screen; if WD 610 is a smart meter, the interaction may be through a screen that provides usage (e.g., the number of gallons used) or a speaker that provides an audible alert (e.g., if smoke is detected). User interface equipment 632 may include input interfaces, devices and circuits, and output interfaces, devices and circuits. User interface equipment 632 is configured to allow input of information into WD 610, and is connected to processing circuitry 620 to allow processing circuitry 620 to process the input information. User interface equipment 632 may include, for example, a microphone, a proximity or other sensor, keys/buttons, a touch display, one or more cameras, a USB port, or other input circuitry. User interface equipment 632 is also configured to allow output of information from WD 610, and to allow processing circuitry 620 to output information from WD 610. User interface equipment 632 may include, for example, a speaker, a display, vibrating circuitry, a USB port, a headphone interface, or other output circuitry. Using one or more input and output interfaces, devices, and circuits, of user interface equipment 632, WD 610 may communicate with end users and/or the wireless network, and allow them to benefit from the functionality described herein.

Auxiliary equipment 634 is operable to provide more specific functionality which may not be generally performed by WDs. This may comprise specialized sensors for doing measurements for various purposes, interfaces for additional types of communication such as wired communications etc. The inclusion and type of components of auxiliary equipment 634 may vary depending on the embodiment and/or scenario.

Power source 636 may, in some embodiments, be in the form of a battery or battery pack. Other types of power sources, such as an external power source (e.g., an electricity outlet), photovoltaic devices or power cells, may also be used. WD 610 may further comprise power circuitry 637 for delivering power from power source 636 to the various parts of WD 610 which need power from power source 636 to carry out any functionality described or indicated herein. Power circuitry 637 may in certain embodiments comprise power management circuitry. Power circuitry 637 may additionally or alternatively be operable to receive power from an external power source; in which case WD 610 may be connectable to the external power source (such as an electricity outlet) via input circuitry or an interface such as an electrical power cable. Power circuitry 637 may also in certain embodiments be operable to deliver power from an external power source to power source 636. This may be, for example, for the charging of power source 636. Power circuitry 637 may perform any formatting, converting, or other modification to the power from power source 636 to make the power suitable for the respective components of WD 610 to which power is supplied.

Figure 7:
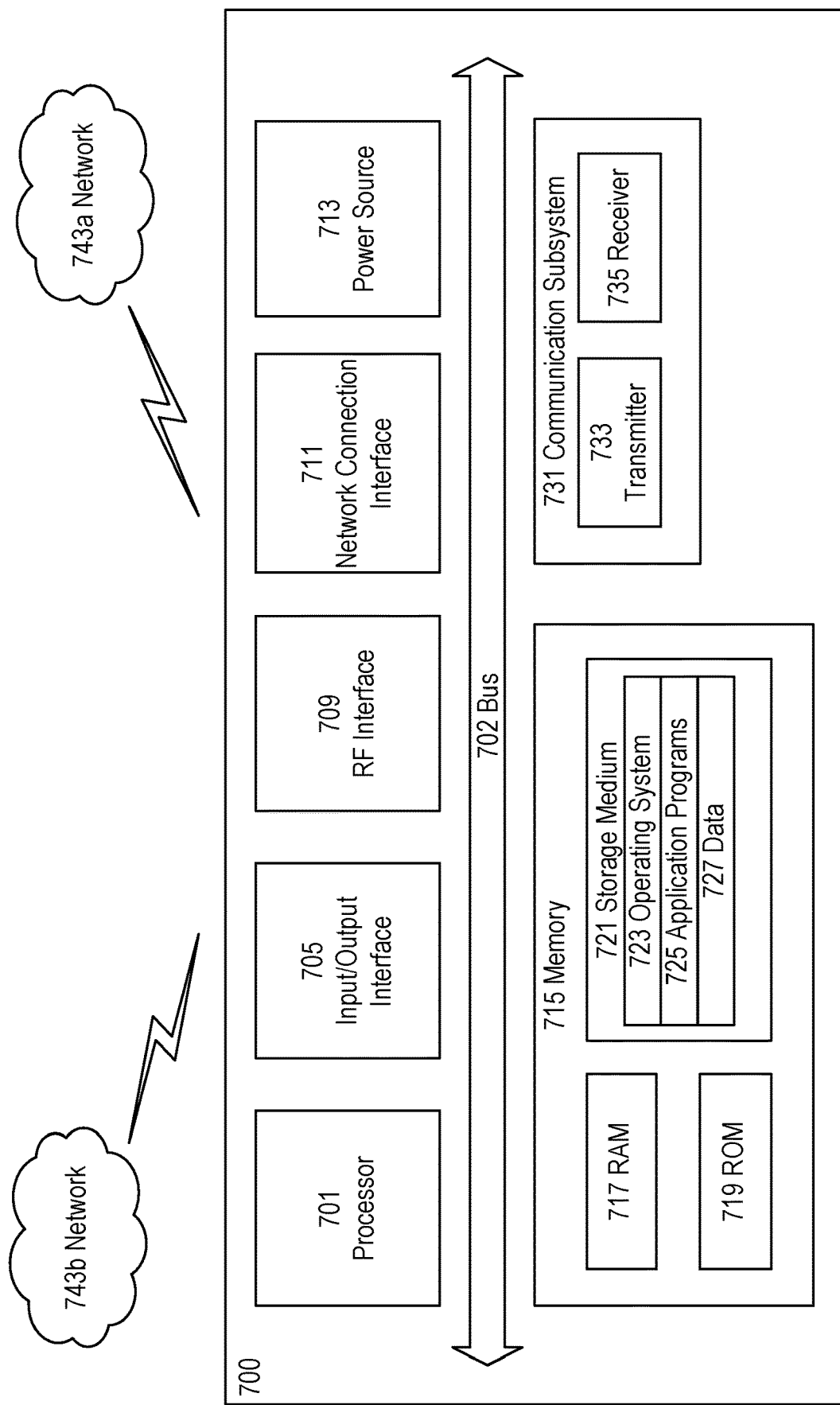
FIG. 7 illustrates a User Equipment in accordance with some embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 700 may be any UE identified by the $3^{rd}$ Generation Partnership Project (3GPP), including a NB-IoT UE, a machine type communication (MTC) UE, and/or an enhanced MTC (eMTC) UE. UE 700, as illustrated in FIG. 7, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 700 includes processing circuitry 701 that is operatively coupled to input/output interface 705, radio frequency (RF) interface 709, network connection interface 711, memory 715 including random access memory (RAM) 717, read-only memory (ROM) 719, and storage medium 721 or the like, communication subsystem 731, power source 733, and/or any other component, or any combination thereof. Storage medium 721 includes operating system 723, application program 725, and data 727. In other embodiments, storage medium 721 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 701 may be configured to process computer instructions and data. Processing circuitry 701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 701 may include two central processing units (CPUs). Data may be information in a form suitable for use by a computer.

In the depicted embodiment, input/output interface 705 may be configured to provide a communication interface to an input device, output device, or input and output device. UE 700 may be configured to use an output device via input/output interface 705. An output device may use the same type of interface port as an input device. For example, a USB port may be used to provide input to and output from UE 700. The output device may be a speaker, a sound card, a video card, a display, a monitor, a printer, an actuator, an emitter, a smartcard, another output device, or any combination thereof. UE 700 may be configured to use an input device via input/output interface 705 to allow a user to capture information into UE 700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 709 may be configured to provide a communication interface to RF components such as a transmitter, a receiver, and an antenna. Network connection interface 711 may be configured to provide a communication interface to network 743*a*. Network 743*a* may encompass wired and/or wireless networks such as a local-area network (LAN), a wide-area network (WAN), a computer network, a wireless network, a telecommunications network, another like network or any combination thereof. For example, network 743*a* may comprise a Wi-Fi network. Network connection interface 711 may be configured to include a receiver and a transmitter interface used to communicate with one or more other devices over a communication network according to one or more communication protocols, such as Ethernet, TCP/IP, SONET, ATM, or the like. Network connection interface 711 may implement receiver and transmitter functionality appropriate to the communication network links (e.g., optical, electrical, and the like). The transmitter and receiver functions may share circuit components, software or firmware, or alternatively may be implemented separately.

RAM 717 may be configured to interface via bus 702 to processing circuitry 701 to provide storage or caching of data or computer instructions during the execution of software programs such as the operating system, application programs, and device drivers. ROM 719 may be configured to provide computer instructions or data to processing circuitry 701. For example, ROM 719 may be configured to store invariant low-level system code or data for basic system functions such as basic input and output (I/O), startup, or reception of keystrokes from a keyboard that are stored in a non-volatile memory. Storage medium 721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 721 may be configured to include operating system 723, application program 725 such as a web browser application, a widget or gadget engine or another application, and data file 727. Storage medium 721 may store, for use by UE 700, any of a variety of various operating systems or combinations of operating systems.

Storage medium 721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 721 may allow UE 700 to access computer-executable instructions, application programs or the like, stored on transitory or non-transitory memory media, to off-load data, or to upload data. An article of manufacture, such as one utilizing a communication system may be tangibly embodied in storage medium 721, which may comprise a device readable medium.

In FIG. 7, processing circuitry 701 may be configured to communicate with network 743*b* using communication subsystem 731. Network 743*a* and network 743*b* may be the same network or networks or different network or networks. Communication subsystem 731 may be configured to include one or more transceivers used to communicate with network 743*b*. For example, communication subsystem 731 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 733 and/or receiver 735 to implement transmitter or receiver functionality, respectively, appropriate to the RAN links (e.g., frequency allocations and the like). Further, transmitter 733 and receiver 735 of each transceiver may share circuit components, software or firmware, or alternatively may be implemented separately.

In the illustrated embodiment, the communication functions of communication subsystem 731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 731 may include cellular communication, Wi-Fi communication, Bluetooth communication, and GPS communication. Network 743*b* may encompass wired and/or wireless networks such as a local-area network (LAN), a wide-area network (WAN), a computer network, a wireless network, a telecommunications network, another like network or any combination thereof. For example, network 743*b* may be a cellular network, a Wi-Fi network, and/or a near-field network. Power source 713 may be configured to provide alternating current (AC) or direct current (DC) power to components of UE 700.

The features, benefits and/or functions described herein may be implemented in one of the components of UE 700 or partitioned across multiple components of UE 700. Further, the features, benefits, and/or functions described herein may be implemented in any combination of hardware, software or firmware. In one example, communication subsystem 731 may be configured to include any of the components described herein. Further, processing circuitry 701 may be configured to communicate with any of such components over bus 702. In another example, any of such components may be represented by program instructions stored in memory that when executed by processing circuitry 701 perform the corresponding functions described herein. In another example, the functionality of any of such components may be partitioned between processing circuitry 701 and communication subsystem 731. In another example, the non-computationally intensive functions of any of such components may be implemented in software or firmware and the computationally intensive functions may be implemented in hardware.

Figure 8:
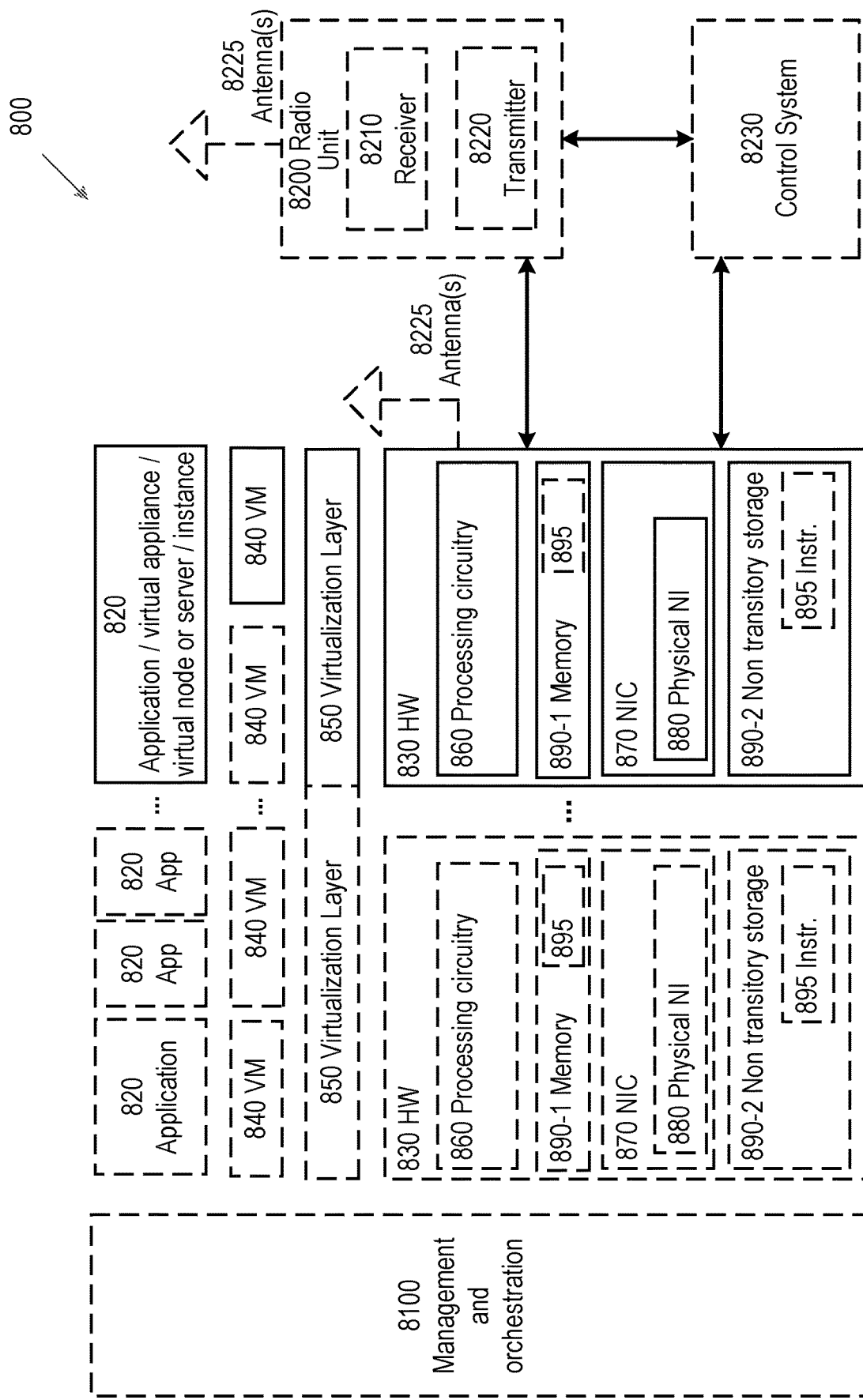
FIG. 8 illustrates a virtualization environment in accordance with some embodiments.

FIG. 8 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 9:
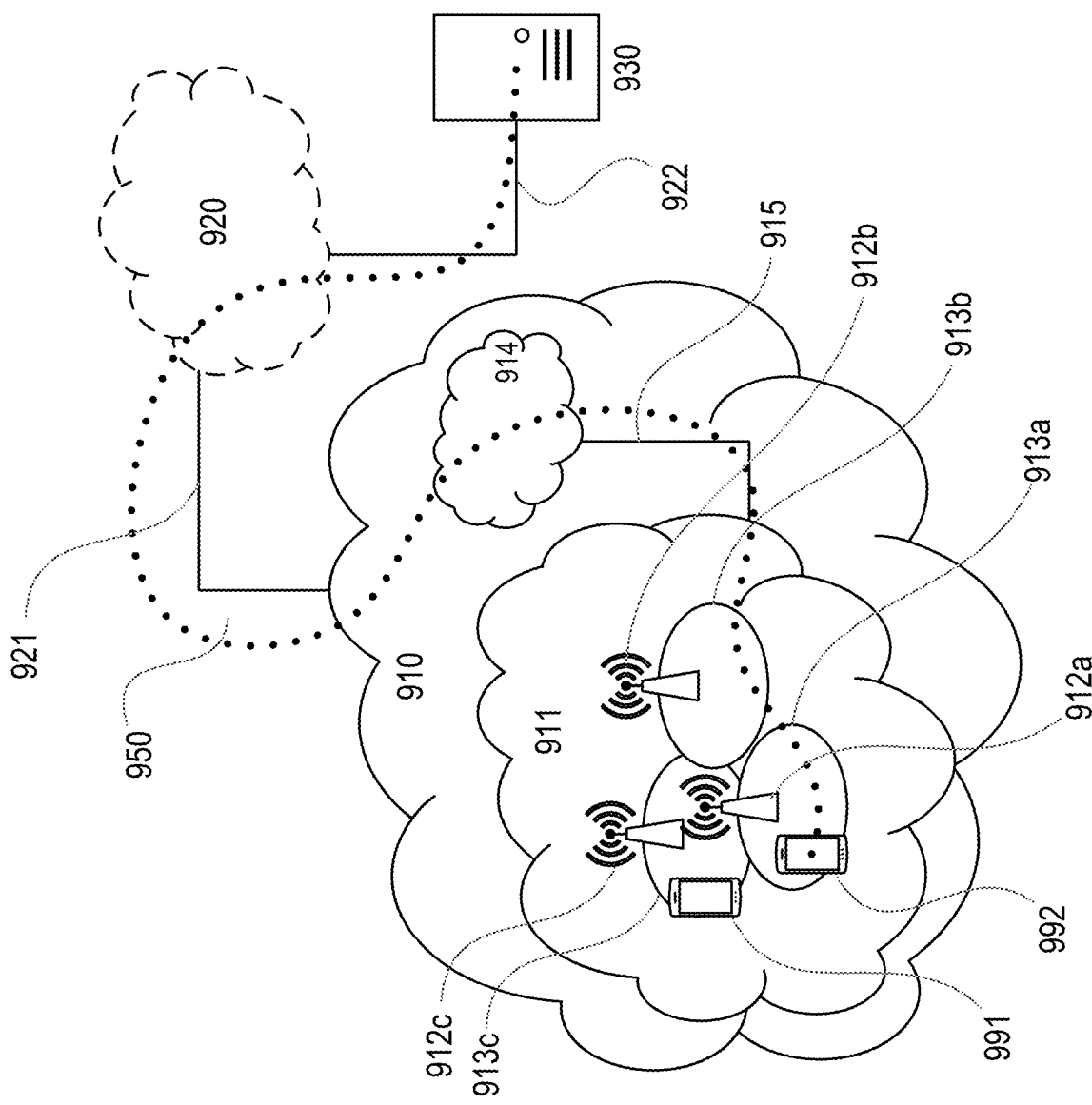
FIG. 9 illustrates a telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signalling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

Figure 10:
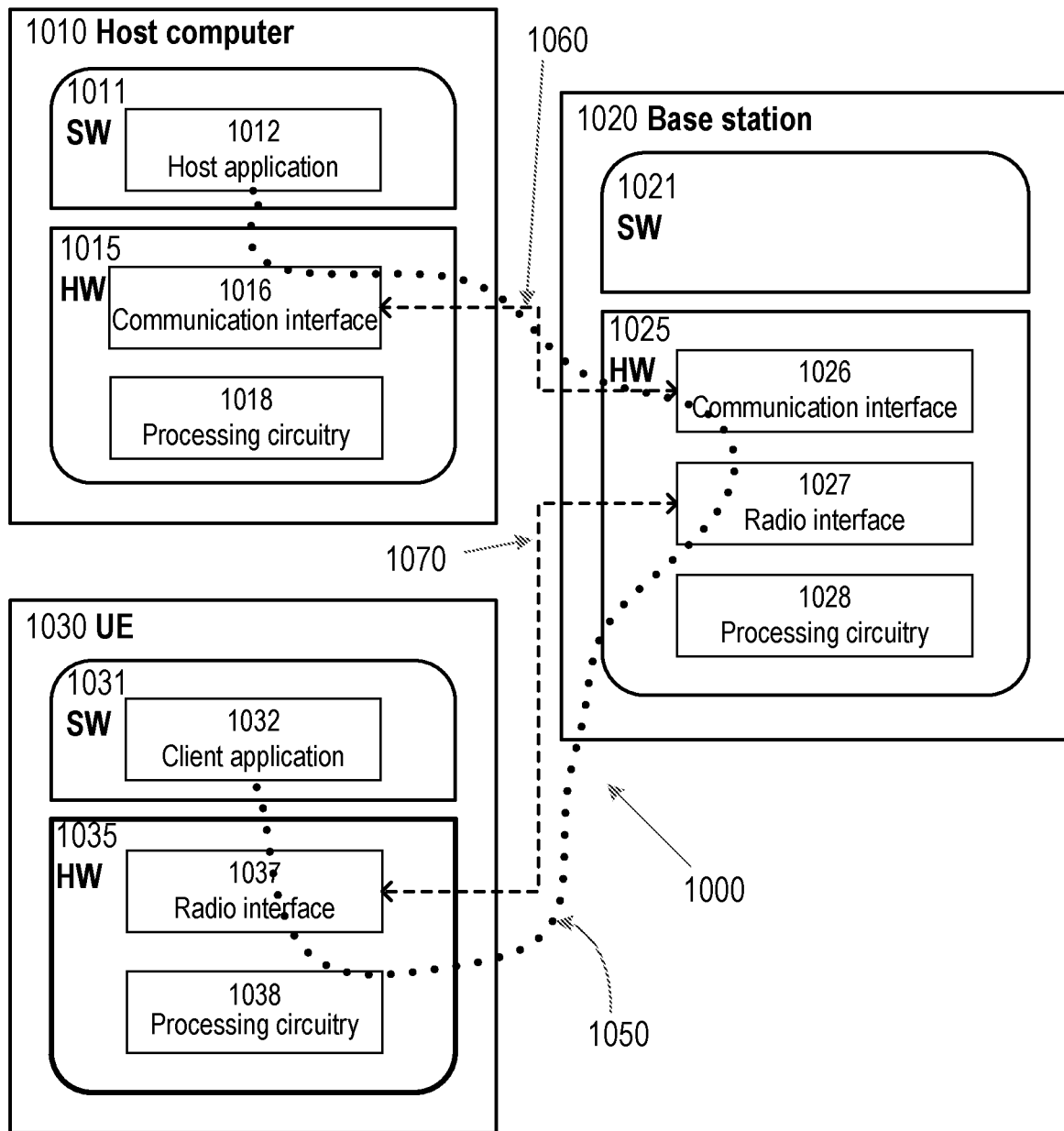
FIG. 10 illustrates a host computer communicating via a base station with a user equipment over a partially wireless connection in accordance with some embodiments.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the utility of the early measurement enhancements for Rel-16 (and subsequent releases) for UEs in deployments that contain a mix of Rel-15 and Rel-16 eNBs, thereby enabling faster CA/DC setup, and thereby provide benefits such as an improved end user experience.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signalling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figure 11:
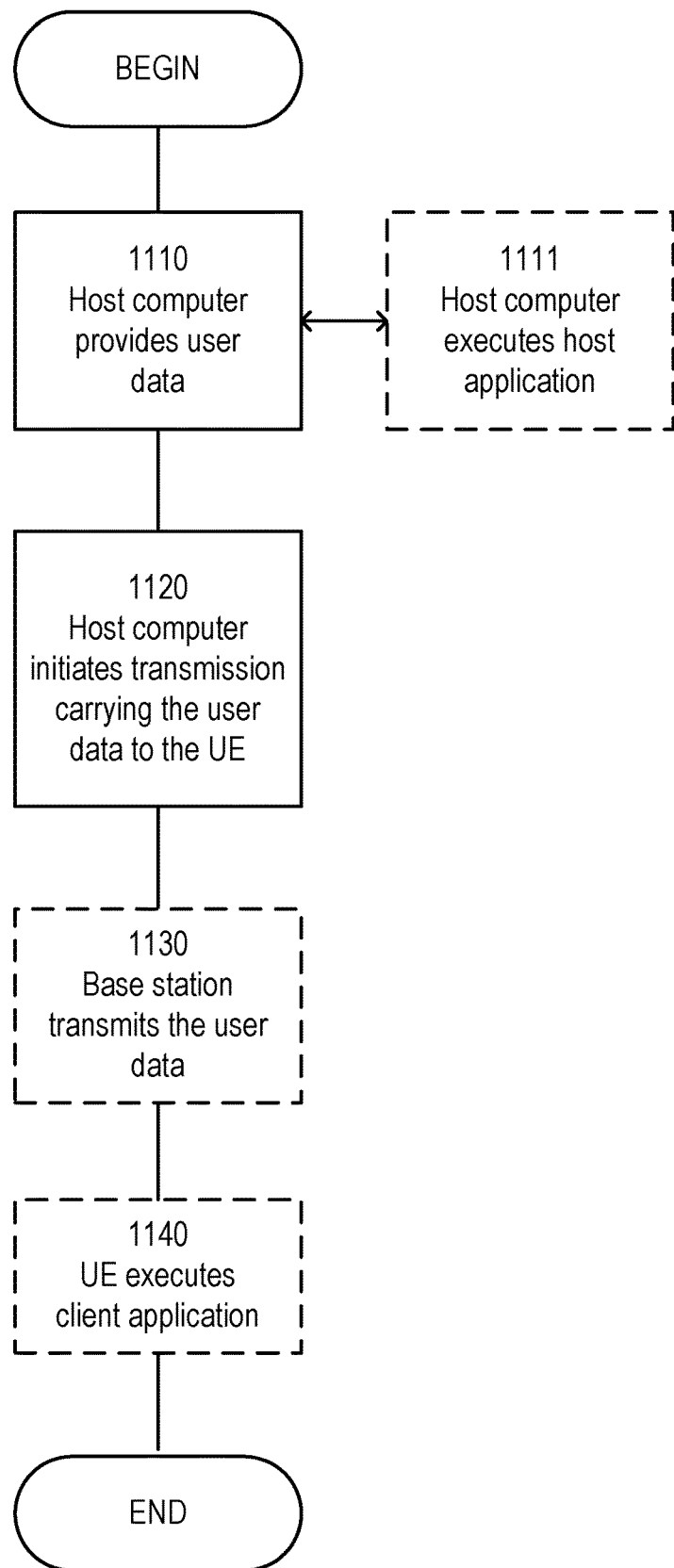
FIG. 11 illustrates methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
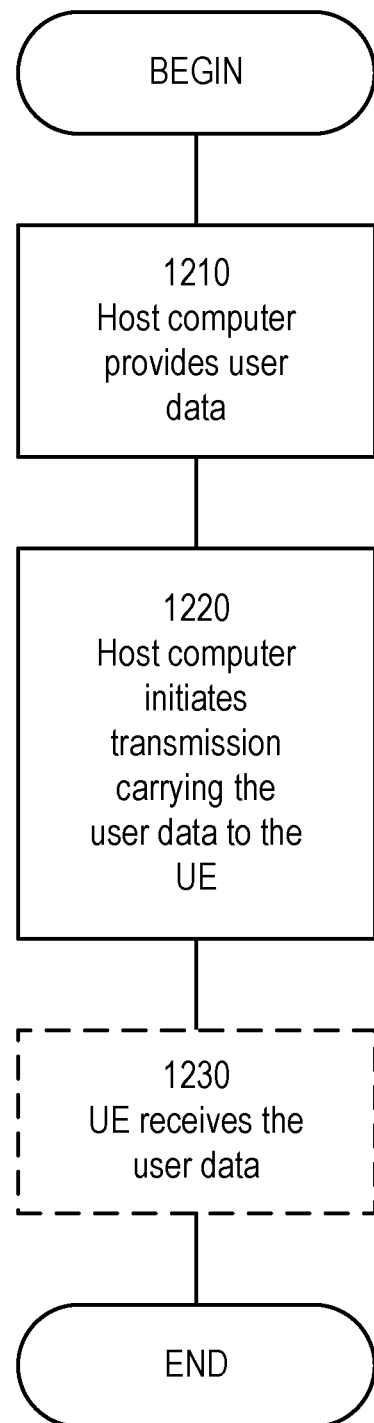
FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
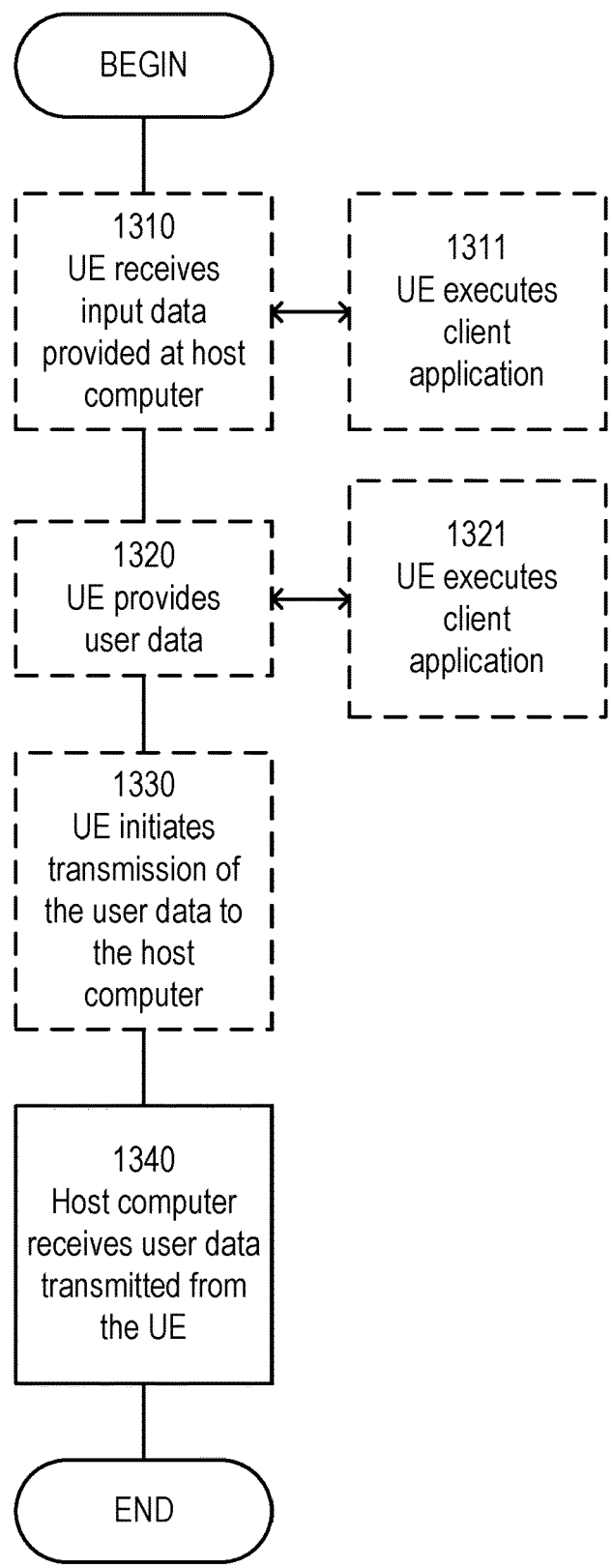
FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
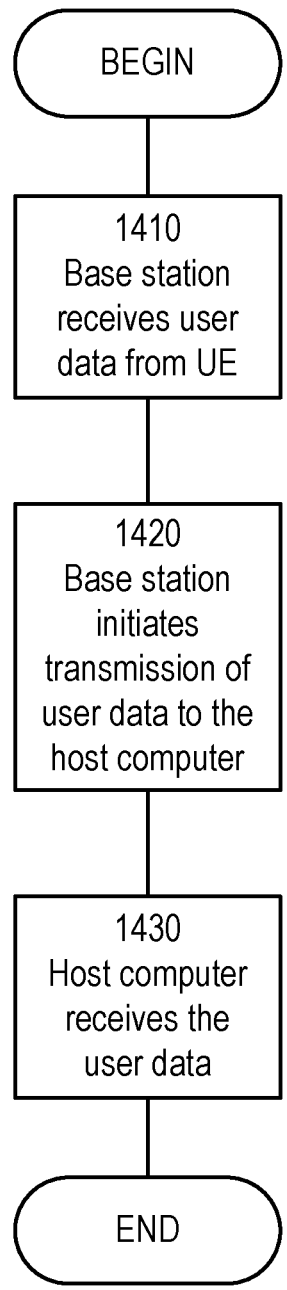
FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Figure 15:
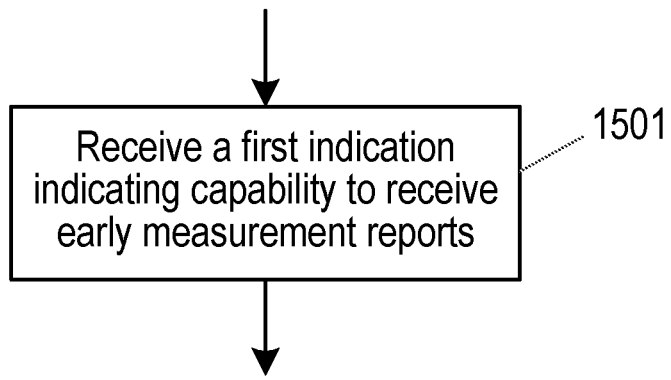
FIG. 15 is a flow chart illustrating a method of operating a wireless device according to an embodiment.

The flow chart in FIG. 15 illustrates a method performed by a wireless device according to various embodiments. The method can be performed by the user equipment shown in FIG. 7 or FIG. 17. The method relates to the handling of early measurement reporting to a network node, such as a base station, or eNB.

In step 1501 the method comprises the wireless device receiving a first indication from the network node. The first indication indicates a capability of the network node to receive early measurement reports for cells operating according to NR. That is, the first indication indicates whether or not the network node can receive early measurement reports for cells operating according to NR. In some embodiments, the first indication indicates that the network node is capable of receiving early measurement reports for cells operating according to NR.

Where the network node operates according to Release 15, the network node is only capable of receiving early measurement reports for cells operating to according LTE. In this case, the first indication indicates that the network node is not capable of receiving early measurement reports for cells operating to according NR. In some embodiments, the first indication that the network node is not capable of receiving early measurement reports for cells operating to NR can be the absence of a positive indication that NR cell measurements can be received.

In some embodiments, the first indication is received from the network node in or as system information (SI), a system information block, SIB, SIB2, an information request IE, an IE in a UEInformationRequest message, or an idleMode-MeasurementReq IE.

In some embodiments, the first indication is a separate indication to a second indication from the network node. The second indication indicates a capability of the network node to receive early measurement reports for cells operating according to LTE. That is, the wireless device can also receive a second indication indicating whether or not the network node can receive early measurement reports for cells operating according to LTE. In some embodiments the first indication and the second indication are received from the network node in SIB2.

In some embodiments, the method further comprises the wireless device performing one or more radio signal measurements of a serving cell and/or one or more neighbouring cells while the wireless device is in an idle state, an idle mode or an inactive state. Any of the serving cell and/or one or more neighbouring cells can be configured to operate according to one or both of 3GPP Release 15 and 3GPP Release 16, LTE and NR or early measurement reporting requirements according to 3GPP Release 15 or 3GPP Release 16. As such, depending on the configuration of the network, the wireless device may only measure cells operating according to Release 15/LTE, only measure cells operating according to Release 16/NR, or measure some cells operating according to Release 15/LTE and some cells operating according to Release 16/NR.

The method can further comprise storing the one or more radio signal measurements of the serving cell and/or one or more neighbouring cells. In these embodiments, the radio signal measurements of LTE cells and NR cells (if measured) can be stored separately. The LTE cell measurements and NR cell measurements can be respectively stored in a 3GPP Release 15 variable/IE and a 3GPP Release 16 variable/IE.

In some embodiments, the method further comprises the wireless device sending the one or more radio signal measurements to the network node. In these embodiments, radio signal measurements of LTE cells and NR cells (if measured) can be sent in separate variables in an early measurement report.

In some embodiments, the wireless device sends a third indication to the network node. The third indication indicates early measurements that the wireless device has available to send to the network node. The wireless device selects the third indication to send to the network node based on the received first indication of the capability of the network node to receive early measurement reports for cells operating according to NR. The third indication can be sent to the network node in or as any one or more of a Radio Resource Control, RRC, message, an IE in a RRC message, an idleMeasAvailable IE, a RRC connection set up complete message, a RRCConnectionSetupComplete message, a RRC connection resume complete message, and a RRCConnectionResumeComplete message.

In some embodiments, if the received first indication indicates that the network node cannot receive early measurement reports for neighbouring cells operating according to NR and the wireless device only has early measurement results available for neighbouring cells operating according to NR (i.e. the wireless device does not have LTE measurements available), the wireless device does not indicate availability of early measurements to the network node (e.g. the wireless device does not send the third indication).

Figure 16:
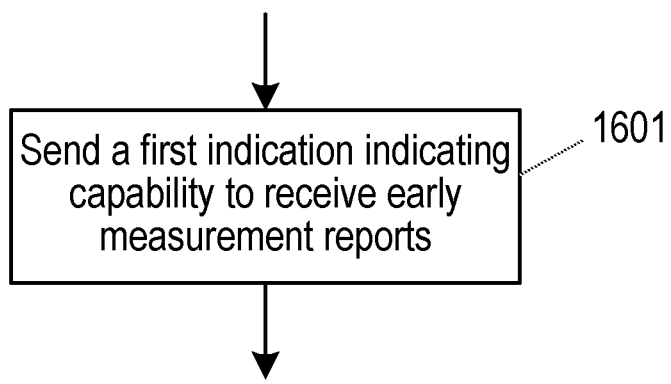
FIG. 16 is a flow chart illustrating a method of operating a base station according to an embodiment.

The flow chart in FIG. 16 illustrates a method performed by a base station (e.g. an eNB) according to various embodiments. The method can be performed by the network node shown in FIG. 18. The method relates to the handling of early measurement reporting from a wireless device, such as a UE.

In step 1601 the method comprises the base station sending a first indication to the wireless device. The first indication indicates a capability of the base station to receive early measurement reports for cells operating according to NR. That is, the first indication indicates whether or not the base station can receive early measurement reports for cells operating according to NR. In some embodiments, the first indication indicates that the base station is capable of receiving early measurement reports for cells operating according to NR.

Where the base station operates according to Release 15, the base station is only capable of receiving early measurement reports for cells operating to according LTE. In this case, the first indication indicates that the base station is not capable of receiving early measurement reports for cells operating to according NR. In some embodiments, the first indication that the base station is not capable of receiving early measurement reports for cells operating to NR can be the absence of a positive indication that NR cell measurements can be received.

In some embodiments, the first indication is sent by the base station in or as SI, a SIB, SIB2, an information request IE, an IE in a UEInformationRequest message, or an idle-ModeMeasurementReq IE.

In some embodiments, the first indication is a separate indication to a second indication from the base station. The second indication indicates a capability of the base station to receive early measurement reports for cells operating according to LTE. That is, the base station can also send a second indication to the wireless device indicating whether or not the base station can receive early measurement reports for cells operating according to LTE. In some embodiments the first indication and the second indication are sent by the base station in SIB2.

In some embodiments, the method further comprises receiving one or more radio signal measurements from the wireless device. In these embodiments, radio signal measurements of LTE cells and NR cells (if present) can be received from the wireless device in separate variables in an early measurement report.

In some embodiments, the base station can receive a third indication from the wireless device. The third indication indicates early measurements that the wireless device has available to send to the base station. The third indication sent by the wireless device is selected based on the first indication of the capability of the base station to receive early measurement reports for cells operating according to NR. The third indication can be received by the base station in or as any one or more of a RRC message, an IE in a RRC message, an idleMeasAvailable IE, a RRC connection set up complete message, a RRCConnectionSetupComplete message, a RRC connection resume complete message, and a RRCConnectionResumeComplete message.

Figure 17:
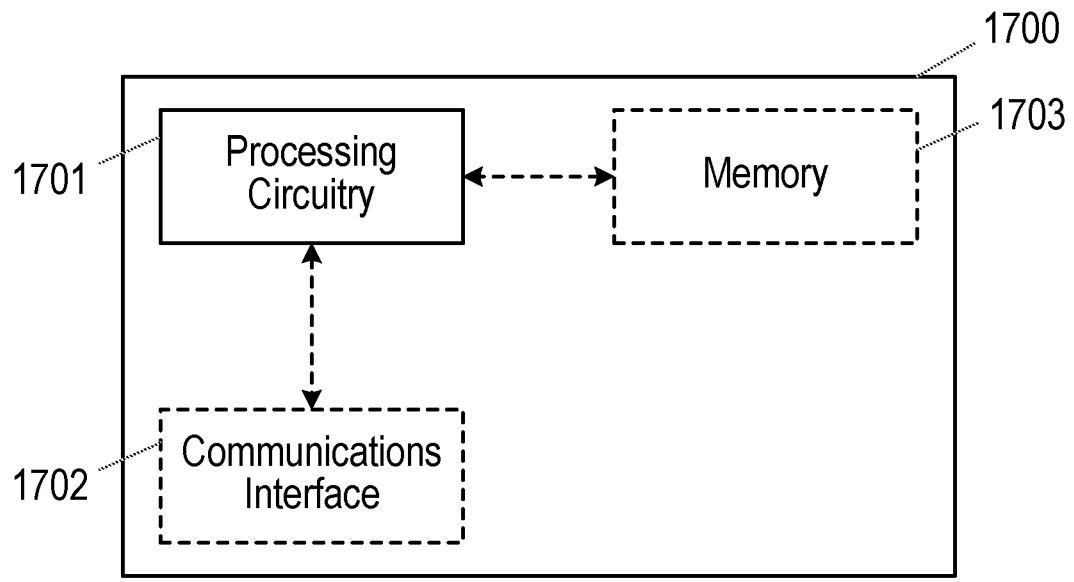
FIG. 17 is a block diagram illustrating a wireless device according to an embodiment.

FIG. 17 is a block diagram of a wireless device 1700 that can be used to implement any of the wireless device or UE methods described herein. It will be appreciated that the wireless device 1700 may comprise one or more virtual machines running different software and/or processes. The wireless device 1700 may therefore comprise one or more servers, switches and/or storage devices and/or may comprise cloud computing infrastructure that runs the software and/or processes.

The wireless device 1700 comprises processing circuitry 1701 that controls the operation of the wireless device 1700 and can implement the methods described herein. The processing circuitry 1701 can comprise one or more processors, processing units, multi-core processors or modules that are configured or programmed to control the wireless device 1700 in the manner described herein. In particular implementations, the processing circuitry 1701 can comprise a plurality of software and/or hardware modules that are each configured to perform, or are for performing, individual or multiple steps of any of the methods described herein.

In some embodiments, the wireless device 1700 may optionally comprise a communications interface 1702. The communications interface 1702 can be for use in communicating with other nodes, such as other virtual nodes. For example, the communications interface 1702 can be configured to transmit to and/or receive from other nodes, network nodes or base stations requests, resources, information, data, signals, or similar. The processing circuitry 1701 may be configured to control the communications interface 1702 of the wireless device 1700 to transmit to and/or receive from other nodes, network nodes, or base stations requests, resources, information, data, signals, or similar.

Optionally, the wireless device 1700 may comprise a memory 1703. In some embodiments, the memory 1703 can be configured to store program code that can be executed by the processing circuitry 1701 to perform any of the methods described herein. Alternatively or in addition, the memory 1703 can be configured to store any requests, resources, information, data, signals, or similar that are described herein. The processing circuitry 1701 may be configured to control the memory 1703 to store any requests, resources, information, data, signals, or similar that are described herein.

Figure 18:
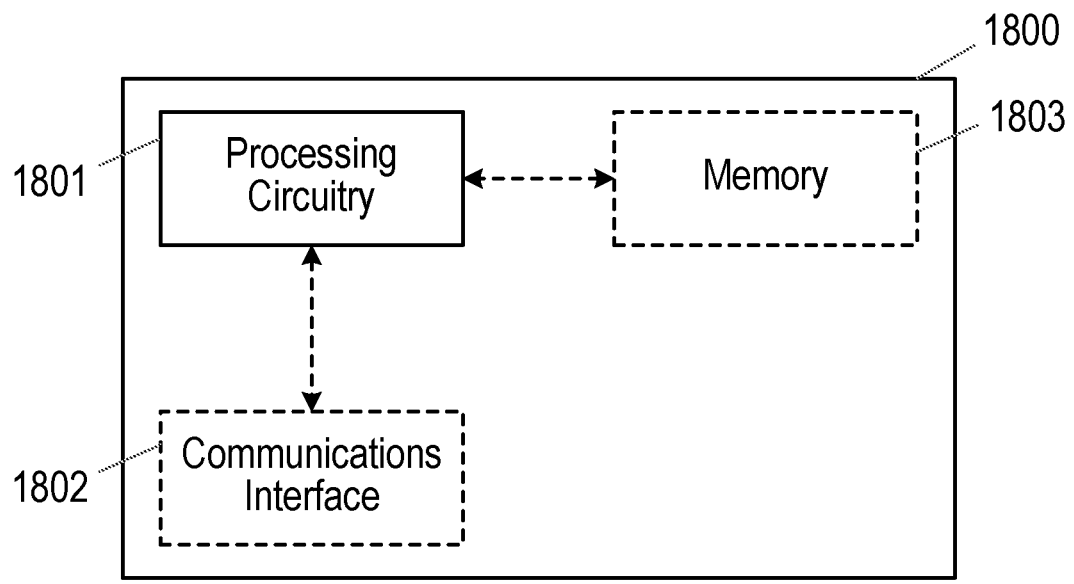
FIG. 18 is a block diagram illustrating a base station according to an embodiment.

FIG. 18 is a block diagram of a network node/base station 1800 that can be used to implement any of the network node, base station or eNB methods described herein. It will be appreciated that the base station 1800 may comprise one or more virtual machines running different software and/or processes. The base station 1800 may therefore comprise one or more servers, switches and/or storage devices and/or may comprise cloud computing infrastructure that runs the software and/or processes.

The base station 1800 comprises processing circuitry 1801 that controls the operation of the base station 1800 and can implement the methods described herein. The processing circuitry 1801 can comprise one or more processors, processing units, multi-core processors or modules that are configured or programmed to control the base station 1800 in the manner described herein. In particular implementations, the processing circuitry 1801 can comprise a plurality of software and/or hardware modules that are each configured to perform, or are for performing, individual or multiple steps of any of the methods described herein.

In some embodiments, the base station 1800 may optionally comprise a communications interface 1802. The communications interface 1802 can be for use in communicating with other nodes, such as other virtual nodes. For example, the communications interface 1802 can be configured to transmit to and/or receive from other nodes, network nodes, base stations, wireless devices, UEs requests, resources, information, data, signals, or similar. The processing circuitry 1801 may be configured to control the communications interface 1802 of the base station 1800 to transmit to and/or receive from other nodes, network nodes, base stations, wireless devices or UEs requests, resources, information, data, signals, or similar.

Optionally, the base station 1800 may comprise a memory 1803. In some embodiments, the memory 1803 can be configured to store program code that can be executed by the processing circuitry 1801 to perform any of the methods described herein. Alternatively or in addition, the memory 1803 can be configured to store any requests, resources, information, data, signals, or similar that are described herein. The processing circuitry 1801 may be configured to control the memory 1803 to store any requests, resources, information, data, signals, or similar that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As noted above, any or all of the aspects or embodiments described herein can be performed by an apparatus in a wireless network (for example, the wireless network shown in FIG. 6). The apparatus may be implemented in a wireless device or network node (e.g., wireless device 610 or network node 660 shown in FIG. 6). The apparatus may be implemented as a Virtual Apparatus which may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause one or more units of the Virtual Apparatus to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Example embodiments can include, but are not limited to, the following enumerated examples:

Group A Embodiments

1. A method performed by a wireless device for handling early measurement reporting to a network node, the method comprising any one or more of the following steps:
   receiving a first indication from the network node, the first indication indicating a capability of the network node to receive early measurement reports; and
   sending a second indication to the network node, the second indication indicating early measurements that the wireless device has available to send to the network node.
2. The method of embodiment 1, wherein the first indication is received from the network node in or as any one or more of:
   system information;
   a system information block, SIB;
   SIB2;
   an information request information element, IE;
   an IE in a UEInformationRequest message; and
   an idleModeMeasurementReq IE.
3. The method of embodiment 1 or 2, wherein the second indication is sent to the network node in or as any one or more of:
   a Radio Resource Control, RRC, message;
   an information element, IE, in a RRC message;
   an idleMeasAvailable IE;
   a RRC connection set up complete message;
   a RRCConnectionSetupComplete message;
   a RRC connection resume complete message; and
   a RRCConnectionResumeComplete message.
4. The method of any of embodiments 1-3, wherein the capability of the network node to receive early measurement reports is any one or more of:
   capability to receive early measurement reports for cells operating according to 3GPP Release 15;
   capability to receive early measurement reports for cells operating according to 3GPP Release 16;
   capability to receive early measurement reports for cells operating according to 3GPP Release 15 and 3GPP Release 16;
   capability to receive early measurement reports for cells operating according to Long Term Evolution, LTE;
   capability to receive early measurement reports for cells operating according to New Radio, NR;
   capability to receive early measurement reports for cells operating according to LTE and NR;
   capability to receive early measurement reports for cells operating according to early measurement reporting requirements defined in 3GPP Release 15;
   capability to receive early measurement reports for cells operating according to early measurement reporting requirements defined in 3GPP Release 16; and
   capability to receive early measurement reports for cells operating according to early measurement reporting requirements defined in 3GPP Release 15 and 3GPP Release 16.
5. The method of any of embodiments 1-4, wherein the second indication indicating early measurements that the wireless device has available to send to the network node is any one or more of:
   an indication that the wireless device has early measurement reports for cells operating according to 3GPP Release 15;
   an indication that the wireless device has early measurement reports for cells operating according to 3GPP Release 16;
   an indication that the wireless device has early measurement reports for cells operating according to 3GPP Release 15 and 3GPP Release 16;
   an indication that the wireless device has early measurement reports for cells operating according to Long Term Evolution, LTE;
   an indication that the wireless device has early measurement reports for cells operating according to New Radio, NR;
   an indication that the wireless device has early measurement reports for cells operating according to LTE and NR;
   an indication that the wireless device has early measurement reports for cells operating according to early measurement reporting requirements defined in 3GPP Release 15;
   an indication that the wireless device has early measurement reports for cells operating according to early measurement reporting requirements defined in 3GPP Release 16; and
   an indication that the wireless device has early measurement reports for cells operating according to early measurement reporting requirements defined in 3GPP Release 15 and 3GPP Release 16.
6. The method of any of embodiments 1-5, wherein the method further comprises the step of:
   performing one or more radio signal measurements of a serving cell and/or one or more neighbouring cells while the wireless device is in an idle mode or inactive state.
7. The method of embodiment 6, wherein the method further comprises the step of:
   storing the one or more radio signal measurements of the serving cell and/or one or more neighbouring cells.
8. The method of embodiment 7, wherein the step of storing comprises any of:
   storing radio signal measurements of 3GPP Release 15 cells and 3GPP Release 16 cells separately;
   storing radio signal measurements of 3GPP Release 15 cells and 3GPP Release 16 cells together;
   storing radio signal measurements of Long Term Evolution, LTE, cells and New Radio, NR, cells separately; and storing radio signal measurements of LTE cells and NR cells together.
9. The method of embodiment 6, 7 or 8, wherein the method further comprises the step of:
sending one or more of the one or more radio signal measurements to the network node according to the capability of the network node to receive early measurement reports.
10. The method of any of embodiments 6-9, wherein each of the serving cell and/or one or more neighbouring cells are configured to operate according to one or both of:
3GPP Release 15 and 3GPP Release 16;
Long Term Evolution, LTE, and New Radio, NR;
early measurement reporting requirements according to 3GPP Release 15 or 3GPP Release 16.
11. The method of any of embodiments 1-10, wherein the wireless device selects the second indication to send to the network node based on the received first indication of the capability of the network node to receive early measurement reports.
12. The method of any of the previous embodiments, further comprising:
providing user data; and
forwarding the user data to a host computer via the transmission to the base station.

Group B Embodiments

13. A method performed by a base station for handling early measurement reporting from a wireless device, the method comprising any one or more of the following steps:
sending a first indication from the wireless device, the first indication indicating a capability of the base station to receive early measurement reports; and
receiving a second indication from the wireless device, the second indication indicating early measurements that the wireless device has available to send to the base station.
14. The method of embodiment 13, wherein the first indication is sent by the base station in or as any one or more of:
system information;
a system information block, SIB;
SIB2;
an information request information element, IE;
an IE in a UEInformationRequest message; and
an idleModeMeasurementReq IE.
15. The method of embodiment 13 or 14, wherein the second indication is received from the wireless device in or as any one or more of:
a Radio Resource Control, RRC, message;
an information element, IE, in a RRC message;
an idleMeasAvailable IE;
a RRC connection set up complete message;
a RRCConnectionSetupComplete message;
a RRC connection resume complete message; and
a RRCConnectionResumeComplete message.
16. The method of any of embodiments 13-15, wherein the capability of the network node to receive early measurement reports is any one or more of:
capability to receive early measurement reports for cells operating according to 3GPP Release 15;
capability to receive early measurement reports for cells operating according to 3GPP Release 16;
capability to receive early measurement reports for cells operating according to 3GPP Release 15 and 3GPP Release 16;
capability to receive early measurement reports for cells operating according to Long Term Evolution, LTE;
capability to receive early measurement reports for cells operating according to New Radio, NR;
capability to receive early measurement reports for cells operating according to LTE and NR;
capability to receive early measurement reports for cells operating according to early measurement reporting requirements defined in 3GPP Release 15;
capability to receive early measurement reports for cells operating according to early measurement reporting requirements defined in 3GPP Release 16; and
capability to receive early measurement reports for cells operating according to early measurement reporting requirements defined in 3GPP Release 15 and 3GPP Release 16.
17. The method of any of embodiments 13-16, wherein the second indication indicating early measurements that the wireless device has available to send to the base station is any one or more of:
an indication that the wireless device has early measurement reports for cells operating according to 3GPP Release 15;
an indication that the wireless device has early measurement reports for cells operating according to 3GPP Release 16;
an indication that the wireless device has early measurement reports for cells operating according to 3GPP Release 15 and 3GPP Release 16;
an indication that the wireless device has early measurement reports for cells operating according to Long Term Evolution, LTE;
an indication that the wireless device has early measurement reports for cells operating according to New Radio, NR;
an indication that the wireless device has early measurement reports for cells operating according to LTE and NR;
an indication that the wireless device has early measurement reports for cells operating according to early measurement reporting requirements defined in 3GPP Release 15;
an indication that the wireless device has early measurement reports for cells operating according to early measurement reporting requirements defined in 3GPP Release 16; and
an indication that the wireless device has early measurement reports for cells operating according to early measurement reporting requirements defined in 3GPP Release 15 and 3GPP Release 16.
18. The method of any of embodiments 13-17, wherein the method further comprises the step of:
receiving one or more radio signal measurements from the wireless device.
19. The method of any of embodiments 13-17, wherein the method further comprises the step of:
receiving one or more radio signal measurements from the wireless device according to the capability of the network node to receive early measurement reports.

20. The method of any of embodiments 13-19, wherein the base station is operating according to:
   3GPP Release 15 and/or 3GPP Release 16;
   Long Term Evolution, LTE, and/or New Radio, NR;
   early measurement reporting requirements according to 3GPP Release 15 and/or 3GPP Release 16.
21. The method of any of embodiments 13-20, further comprising:
   obtaining user data; and
   forwarding the user data to a host computer or a wireless device.

Group C Embodiments

22. A wireless device for handling early measurement reporting to a network node, the wireless device comprising:
   processing circuitry configured to perform any of the steps of any of the Group A embodiments; and
   power supply circuitry configured to supply power to the wireless device.
23. A base station for handling early measurement reporting from a wireless device, the base station comprising:
   processing circuitry configured to perform any of the steps of any of the Group B embodiments;
   power supply circuitry configured to supply power to the base station.
24. A user equipment (UE) for handling early measurement reporting to a network node, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.
25. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.
26. The communication system of the previous embodiment further including the base station.
27. The communication system of the previous 2 embodiments, further including the UE, wherein the UE is configured to communicate with the base station.
28. The communication system of the previous 3 embodiments, wherein:
   the processing circuitry of the host computer is configured to execute a host application, thereby providing the user data; and
   the UE comprises processing circuitry configured to execute a client application associated with the host application.
29. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the base station performs any of the steps of any of the Group B embodiments.
30. The method of the previous embodiment, further comprising, at the base station, transmitting the user data.
31. The method of the previous 2 embodiments, wherein the user data is provided at the host computer by executing a host application, the method further comprising, at the UE, executing a client application associated with the host application.
32. A user equipment (UE) configured to communicate with a base station, the UE comprising a radio interface and processing circuitry configured to performs any of the previous 3 embodiments.
33. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.
34. The communication system of the previous embodiment, wherein the cellular network further includes a base station configured to communicate with the UE.
35. The communication system of the previous 2 embodiments, wherein:
   the processing circuitry of the host computer is configured to execute a host application, thereby providing the user data; and
   the UE's processing circuitry is configured to execute a client application associated with the host application.
36. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.
37. The method of the previous embodiment, further comprising at the UE, receiving the user data from the base station.
38. A communication system including a host computer comprising:
   communication interface configured to receive user data originating from a transmission from a user equipment (UE) to a base station, wherein the UE comprises a radio interface and processing circuitry, the UE's processing circuitry configured to perform any of the steps of any of the Group A embodiments.
39. The communication system of the previous embodiment, further including the UE.
40. The communication system of the previous 2 embodiments, further including the base station, wherein the base station comprises a radio interface configured to communicate with the UE and a communication interface configured to forward to the host computer the user data carried by a transmission from the UE to the base station.
41. The communication system of the previous 3 embodiments, wherein:
the processing circuitry of the host computer is configured to execute a host application; and
the UE's processing circuitry is configured to execute a client application associated with the host application, thereby providing the user data.
42. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.
43. A method implemented in a communication system including a host computer, a base station and a user equipment (UE), the method comprising:
at the host computer, receiving user data transmitted to the base station from the UE, wherein the UE performs any of the steps of any of the Group A embodiments.
44. The method of the previous embodiment, further comprising, at the UE, providing the user data to the base station.
45. The method of the previous 2 embodiments, further comprising:
at the UE, executing a client application, thereby providing the user data to be transmitted; and
at the host computer, executing a host application associated with the client application.
46. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.
47. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
48. The communication system of the previous embodiment further including the base station.
49. The communication system of the previous 2 embodiments, further including the UE, wherein the UE is configured to communicate with the base station.
50. The communication system of the previous 3 embodiments, wherein:
the processing circuitry of the host computer is configured to execute a host application;
the UE is configured to execute a client application associated with the host application, thereby providing the user data to be received by the host computer.
51. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.
52. The method of the previous embodiment, further comprising at the base station, receiving the user data from the UE.
53. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
DC Dual Connectivity
EN-DC E-UTRA NR Dual Connectivity
LTE-DC LTE Dual Connectivity
MCG Master Cell Group
MN Master Node
MR-DC Multi-Radio Dual Connectivity
NR-DC NR-NR Dual Connectivity
NE-DC NR-E-UTRA Dual Connectivity
SCG Secondary Cell Group
SN Secondary Node
SRB Signalling Radio Bearer
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for handling early measurement reporting to a network node, the method comprising:
performing one or more 3rd Generation Partnership Project, 3GPP, Release 16, Rel-16, radio signal measurements of one or more of: a serving cell and one or more neighboring cells while the wireless device is in an idle state, an idle mode or an inactive state;
storing the one or more Rel-16 radio signal measurements of the one or more of: the serving cell and the one or more neighboring cells;
receiving a first indication from the network node, the first indication indicating a capability of the network node to only receive early measurement reports for cells operating according to Long Term Evolution, LTE; and
abstaining from sending a third indication to the network node, the third indication indicating early measurements that the wireless device has available to send to the network node.

2. The method of claim 1, wherein the first indication is received from the network node in or as any one or more of:
system information;
a System Information Block, SIB;
SIB2;
an information request Information Element, IE;
an IE in a UEInformationRequest message; and
an idleModeMeasurementReq IE.

3. The method of claim 1, wherein the step of storing comprises any of:
storing radio signal measurements of Long Term Evolution, LTE, cells and New Radio, NR, cells separately; and storing radio signal measurements of LTE cells in a 3GPP Release 15 variable and storing radio signal measurements of NR cells in a separate 3GPP Release 16 variable.

4. The method of claim 1, wherein each of the one or more of: the serving cell and the one or more neighboring cells are configured to operate according to one or both of:
   3GPP Release 15 and 3GPP Release 16;
   Long Term Evolution, LTE, and New Radio, NR; and
   early measurement reporting requirements according to 3GPP Release 15 or 3GPP Release 16.

5. The method of claim 1, wherein the third indication is sent to the network node in or as any one or more of:
   a Radio Resource Control, RRC, message;
   an Information Element, IE, in a RRC message;
   an idleMeasAvailable IE;
   a RRC connection set up complete message;
   a RRCConnectionSetupComplete message;
   a RRC connection resume complete message; and
   a RRCConnectionResumeComplete message.

6. The method of claim 1, wherein the network node is an Enhanced or Evolved Node B, eNB.

7. A computer program product comprising a non-transitory computer readable medium having computer readable code embodied therein, the computer readable code being configured such that, on execution by a suitable processor, the processor is caused to:
   perform one or more 3rd Generation Partnership Project, 3GPP, Release 16, Rel-16, radio signal measurements of one or more of: a serving cell and one or more neighboring cells while the wireless device is in an idle state, an idle mode or an inactive state;
   store the one or more Rel-16 radio signal measurements of the one or more of: the serving cell and the one or more neighboring cells;
   receive a first indication from the network node, the first indication indicating a capability of the network node to only receive early measurement reports for cells operating according to Long Term Evolution, LTE; and
   abstain from sending a third indication to the network node, the third indication indicating early measurements that the wireless device has available to send to the network node.

8. A wireless device configured for handling early measurement reporting to a network node, the wireless device configured to:
   performing one or more 3rd Generation Partnership Project, 3GPP, Release 16, Rel-16, radio signal measurements of one or more of: a serving cell and one or more neighboring cells while the wireless device is in an idle state, an idle mode or an inactive state;
   storing the one or more Rel-16 radio signal measurements of the one or more of: the serving cell and the one or more neighboring cells;
   receive a first indication from the network node, the first indication indicating a capability of the network node to receive early measurement reports for cells operating according to Long Term Evolution, LTE; and
   abstaining from sending a third indication to the network node, the third indication indicating early measurements that the wireless device has available to send to the network node.

9. The wireless device of claim 8, wherein the first indication is received from the network node in or as any one or more of:
   system information;
   a System Information Block, SIB;
   SIB2;
   an information request Information Element, IE;
   an IE in a UEInformationRequest message; and
   an idleModeMeasurementReq IE.

10. The wireless device of claim 8, wherein the wireless device is configured to:
    store radio signal measurements of Long Term Evolution, LTE, cells and New Radio, NR, cells separately; or
    store radio signal measurements of LTE cells in a 3GPP Release 15 variable and store radio signal measurements of NR cells in a separate 3GPP Release 16 variable.

11. The wireless device of claim 8, wherein each of the one or more of: the serving cell and the one or more neighboring cells are configured to operate according to one or both of:
    3GPP Release 15 and 3GPP Release 16;
    Long Term Evolution, LTE, and New Radio, NR; and
    early measurement reporting requirements according to 3GPP Release 15 or 3GPP Release 16.

12. The wireless device of claim 8, wherein the third indication is sent to the network node in or as any one or more of:
    a Radio Resource Control, RRC, message;
    an Information Element, IE, in a RRC message;
    an idleMeasAvailable IE;
    a RRC connection set up complete message;
    a RRCConnectionSetupComplete message;
    a RRC connection resume complete message; and
    a RRCConnectionResumeComplete message.

13. The wireless device of claim 8, wherein the network node is an Enhanced or Evolved Node B, eNB.

* * * * *

UNITED STATES PATENT AND TRADEMARK OFFICE
CERTIFICATE OF CORRECTION

PATENT NO. : 12,256,256 B2
APPLICATION NO. : 17/768242
DATED : March 18, 2025
INVENTOR(S) : Rugeland et al.

It is certified that error appears in the above-identified patent and that said Letters Patent is hereby corrected as shown below:

In the Specification

In Column 11, Line 30, delete "Re-15" and insert -- Rel-15 --, therefor.

In Column 17, Line 42, delete "rach-ReportReg" and insert -- rach-ReportReq --, therefor.

In Column 56, Line 50, delete "Carrier Component" and insert -- Component Carrier --, therefor.

In Column 56, Line 52, delete "Code Division Multiplexing Access" and insert -- Code-Division Multiple Access --, therefor.

In Column 56, Line 53, delete "Identifier" and insert -- Identity --, therefor.

In Column 57, Line 4, delete "E-SMLC Evolved-Serving Mobile Location Centre".

In Column 57, Line 47, delete "Profile Delay Profile" and insert -- Power Delay Profile --, therefor.

In Column 57, Line 52, delete "Precoder Matrix Indicator" and insert -- Precoding Matrix Indicator --, therefor.

In Column 57, Line 62, delete "Radio Link Management" and insert -- Radio Link Monitoring --, therefor.

In Column 58, Line 17, delete "Self Optimized Network" and insert -- Self-Organizing Network --, therefor.

In Column 58, Line 32, delete "Wide CDMA" and insert -- Wideband CDMA --, therefor.

Signed and Sealed this
Twenty-third Day of December, 2025

John A. Squires
*Director of the United States Patent and Trademark Office*

CERTIFICATE OF CORRECTION (continued)
U.S. Pat. No. 12,256,256 B2

In Column 58, Line 33, delete "Wide Local Area Network" and insert -- Wireless Local Area Network --, therefor.